US011953939B2

(12) United States Patent
Baltrenas et al.

(10) Patent No.: US 11,953,939 B2
(45) Date of Patent: Apr. 9, 2024

(54) CLOCK MANAGEMENT SYSTEMS AND METHODS

(71) Applicant: Oversec, UAB, Vilnius (LT)

(72) Inventors: Lukas Baltrenas, Vilnius (LT); Gvidas Uzkuras, Vilnius (LT)

(73) Assignee: Oversec, UAB, Vilnius (LT)

( * ) Notice: Subject to any disclaimer, the term of this patent is extended or adjusted under 35 U.S.C. 154(b) by 0 days.

(21) Appl. No.: 17/685,623

(22) Filed: Mar. 3, 2022

(65) Prior Publication Data

US 2023/0280785 A1 Sep. 7, 2023

(51) Int. Cl.
*G06F 1/14* (2006.01)

(52) U.S. Cl.
CPC .................... *G06F 1/14* (2013.01)

(58) Field of Classification Search
None
See application file for complete search history.

(56) References Cited

U.S. PATENT DOCUMENTS

| | | | | |
|---|---|---|---|---|
| 8,719,452 B1* | 5/2014 | Ding | ........... | H04N 21/4344 709/248 |
| 9,590,821 B2* | 3/2017 | Brandstätter | ......... | H04L 69/164 |
| 10,796,305 B1* | 10/2020 | Farrow | ........... | G06Q 20/202 |
| 10,944,818 B1* | 3/2021 | Izenberg | ........... | H04L 43/067 |
| 2008/0141231 A1* | 6/2008 | Kantorowitz | ........... | G06F 8/38 717/147 |
| 2015/0156262 A1* | 6/2015 | Alves | ........... | H04L 69/28 709/201 |
| 2015/0295669 A1* | 10/2015 | Chapman | ........... | H04L 12/2801 370/503 |
| 2017/0063985 A1* | 3/2017 | Xun | ........... | H04J 3/0661 |

* cited by examiner

*Primary Examiner* — Fahmida Rahman
(74) *Attorney, Agent, or Firm* — Young Basile Hanlon & MacFarlane, P.C.

(57) ABSTRACT

The disclosure generally pertains to clock management systems and methods. An example method involves a computer identifying an inaccuracy in a local clock of a client device based on a data bundle received from the client device. The data bundle can include information associated with an occurrence of an event in the client device. In one embodiment, the inaccuracy in the local clock of the client device is identified by detecting a time difference between a timestamp contained in the data bundle and a reference time standard. The timestamp can correspond to a time of occurrence of the event in the client device or to a time of transmission of the bundle by the client device. A corrective action may be taken to address the inaccuracy in the local clock, such as, by applying a time shift to at least a portion of the information contained in the data bundle.

15 Claims, 10 Drawing Sheets

CLOCK MANAGEMENT SYSTEMS AND METHODS

BACKGROUND

Operations related to computing systems, and system features thereof, are often dependent upon accurate timing. As such, it would be advantageous to ensure accuracy in timing when performing various operations associated with computing systems, and system features thereof.

SUMMARY

Disclosed herein are example implementations of systems and methods to execute clock management.

An aspect of the disclosure is a method that may include receiving, by a first computer, a data bundle generated by a first client device, the data bundle comprising information associated with an occurrence of a first event in the first client device; identifying, by the first computer, based on the data bundle, an inaccuracy in a local clock of the first client device; and executing, by the first computer, a corrective action to address the inaccuracy in the local clock of the first client device.

In the aspects described herein, the first event is associated with at least one of an action executed by a user upon the first client device or an autonomous action executed by the first client device in response to the action executed by the user.

In the aspects described herein, executing the corrective action comprises selecting, by the first computer, a time shift based on compensating for the inaccuracy in the local clock of the first client device; and applying, by the first computer, the time shift to at least a portion of the information contained in the data bundle.

In the aspects described herein, the data bundle further comprises at least one of a first timestamp or a second timestamp, the first timestamp corresponding to a time of occurrence of the first event and the second timestamp corresponding to a time of transmission of the data bundle by the first client device to the first computer and the method further includes generating, by the first computer, a third timestamp corresponding to a time of receipt of the data bundle by the first computer, the third timestamp referenced to a reference time standard; determining, by the first computer, a time difference between the third timestamp and the at least one of the first timestamp or the second timestamp; and identifying, by the first computer, the inaccuracy in the local clock of the first client device based on the time difference between the third timestamp and the at least one of the first timestamp or the second timestamp.

In the aspects described herein, executing the corrective action to address the inaccuracy in the local clock of the first client device includes comparing, by the first computer, the time difference to a threshold error value; and modifying the at least one of the first timestamp or the second timestamp subject to the time difference exceeding the threshold error value.

In the aspects described herein, communications between the first client device and the first computer are propagated via a second computer that is configured to support virtual private network operations, and the method further includes detecting, by the first client device, an occurrence of a second event; obtaining, by the first client device, from an individual, an approval to authorize transmitting to the first computer, the information associated with the first event and the second event; generating, by the first client device, a fourth timestamp corresponding to the occurrence of the second event; including, by the first client device, in the data bundle transmitted by the first client device to the first computer, the fourth timestamp and information associated with the second event executed on the first client device; receiving, by the first computer, via the second computer, the data bundle in a virtual private network format, the data bundle comprising the fourth timestamp, the information associated with the second event executed on the first client device and the at least one of the first timestamp corresponding to the time of occurrence of the first event or the second timestamp corresponding to the time of transmission of the data bundle by the first client device; and performing, by the first computer, a data analytics procedure upon the data bundle based on use of at least one of the first timestamp, the second timestamp, the third timestamp, or the fourth timestamp.

Another aspect of the disclosure is a method that may include detecting, by a first client device, an occurrence of a first event in the first client device; generating, by the first client device, an indication of a time of occurrence of the first event based on a local clock of the first client device; and transmitting, by the first client device, to a first computer, a data bundle comprising information associated with the first event and the indication of the time of occurrence of the first event.

In the aspects described herein, the first event is associated with at least one of an action executed by a user upon the first client device or an autonomous action executed by the first client device in response to the action executed by the user.

In the aspects described herein, the method may further include receiving, by the first computer, the data bundle transmitted by the first client device; identifying, by the first computer, based on the data bundle, an inaccuracy in the local clock of the first client device; and executing, by the first computer, a corrective action to address the inaccuracy in the local clock of the first client device.

In the aspects described herein, the data bundle further comprises at least one of a first timestamp or a second timestamp, the first timestamp providing the indication of the time of occurrence of the first event, the second timestamp corresponding to a time of transmission of the data bundle from the first client device.

In the aspects described herein, the method further includes determining, by the first client device, an offline status of the first client device at a first instant in time; determining, by the first client device, an online status of the first client device at a second instant in time; generating, by the first client device, the second timestamp at the second instant in time; and transmitting, to the first computer, at the second instant in time, the data bundle comprising the information associated with the first event and the at least one of the first timestamp or the second timestamp.

In the aspects described herein, the method further includes determining, by the first client device, an offline status of the first client device at a first instant in time; detecting, by the first client device, an occurrence of a second event; generating, by the first client device, a third timestamp associated with the occurrence of the second event; including, by the first client device, in the data bundle, the third timestamp and information associated with the second event; determining, by the first client device, an online status of the first client device at a second instant in time; generating, by the first client device, the second timestamp at the second instant in time; and transmitting, to the first computer, at the second instant in time, the data bundle comprising the information associated with the first event, the information associated with the second event, the third timestamp, and the at least one of the first timestamp or the second timestamp.

In the aspects described herein, the method further includes receiving, by the first computer, via a virtual private network, the data bundle comprising the information associated with the first event and the at least one of the first timestamp or the second timestamp; generating, by the first computer, a third timestamp corresponding to a time of receipt of the data bundle by the first computer, the third timestamp referenced to a reference time standard; evaluating, by the first computer, a time difference between the third timestamp and the at least one of the first timestamp or the second timestamp; comparing, by the first computer, the time difference to a threshold error value; and modifying, by the first computer, the at least one of the first timestamp or the second timestamp subject to the time difference exceeding the threshold error value.

In the aspects described herein, the method further includes identifying, by the first computer, in the data bundle, a fourth timestamp corresponding to a time of occurrence of a second event in the first client device; and modifying, by the first computer, the fourth timestamp after modifying the at least one of the first timestamp or the second timestamp.

Another aspect of the disclosure is a system that includes a first computer. The first computer can include a first non-transitory computer-readable storage medium and a first processor that is configured to execute instructions stored in the first non-transitory computer-readable storage medium to at least receive a data bundle generated by a first client device, the data bundle comprising information associated with an occurrence of a first event in the first client device; identify, based on the data bundle, an inaccuracy in a local clock of the first client device; and execute a corrective action to address the inaccuracy in the local clock of the first client device.

In the aspects described herein, the first event is associated with at least one of an action executed by a user upon the first client device or an autonomous action executed by the first client device in response to the action executed by the user.

In the aspects described herein, executing the corrective action comprises selecting a time shift based on compensating for the inaccuracy in the local clock of the first client device; and applying the time shift to at least a portion of the information contained in the data bundle.

In the aspects described herein, the first client device includes a second non-transitory computer-readable storage medium and a second processor configured to execute instructions stored in the second non-transitory computer-readable storage medium to at least generate a first timestamp corresponding to a time of occurrence of the first event; generate a second timestamp corresponding to a time of transmission of the data bundle to the first computer; and include at least one of the first timestamp or the second timestamp in the data bundle transmitted to the first computer.

In the aspects described herein, the first processor in the first computer is further configured to execute instructions stored in the first non-transitory computer-readable storage medium to at least generate a third timestamp corresponding to a time of receipt of the data bundle by the first computer, the third timestamp referenced to a reference time standard; determine a time difference between the third timestamp and at least one of the first timestamp or the second timestamp; and identify the inaccuracy in the local clock of the first client device based on the time difference between the third timestamp and the at least one of the first timestamp or the second timestamp.

In the aspects described herein, the time difference between the third timestamp and the at least one of the first timestamp or the second timestamp is one of a positive time difference or a negative time difference.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts, or descriptively similar parts, throughout the several views and embodiments.

DETAILED DESCRIPTION

The disclosure generally pertains to systems and method for clock management, and particularly pertains to systems and methods for ensuring that timestamps generated by a client device are accurate. An example method to verify the accuracy of the timestamps generated by a client device includes executing operations such as receiving by a server computer, a data bundle generated by the client device. The data bundle contains information associated with an event executed on the client device, a first timestamp corresponding to a time of execution of the event and/or or a second timestamp corresponding to a time of transmission of the data bundle from the client device t the server computer. The server computer generates a third timestamp corresponding to a time of receipt of the data bundle. The third timestamp is referenced to a reference time standard such as, for example, Coordinated universal Time (UTC). The server computer identifies an inaccuracy (if present) in the local clock of the client device by determining whether a time difference between the third timestamp and the first timestamp and/or the second timestamp exceeds a threshold error value. If the threshold error value is exceeded, a corrective action may be executed to address the inaccuracy in the local clock of the client device. In one case, the corrective action can involve modifying the timestamps that are included in the data bundle.

Figure 1:
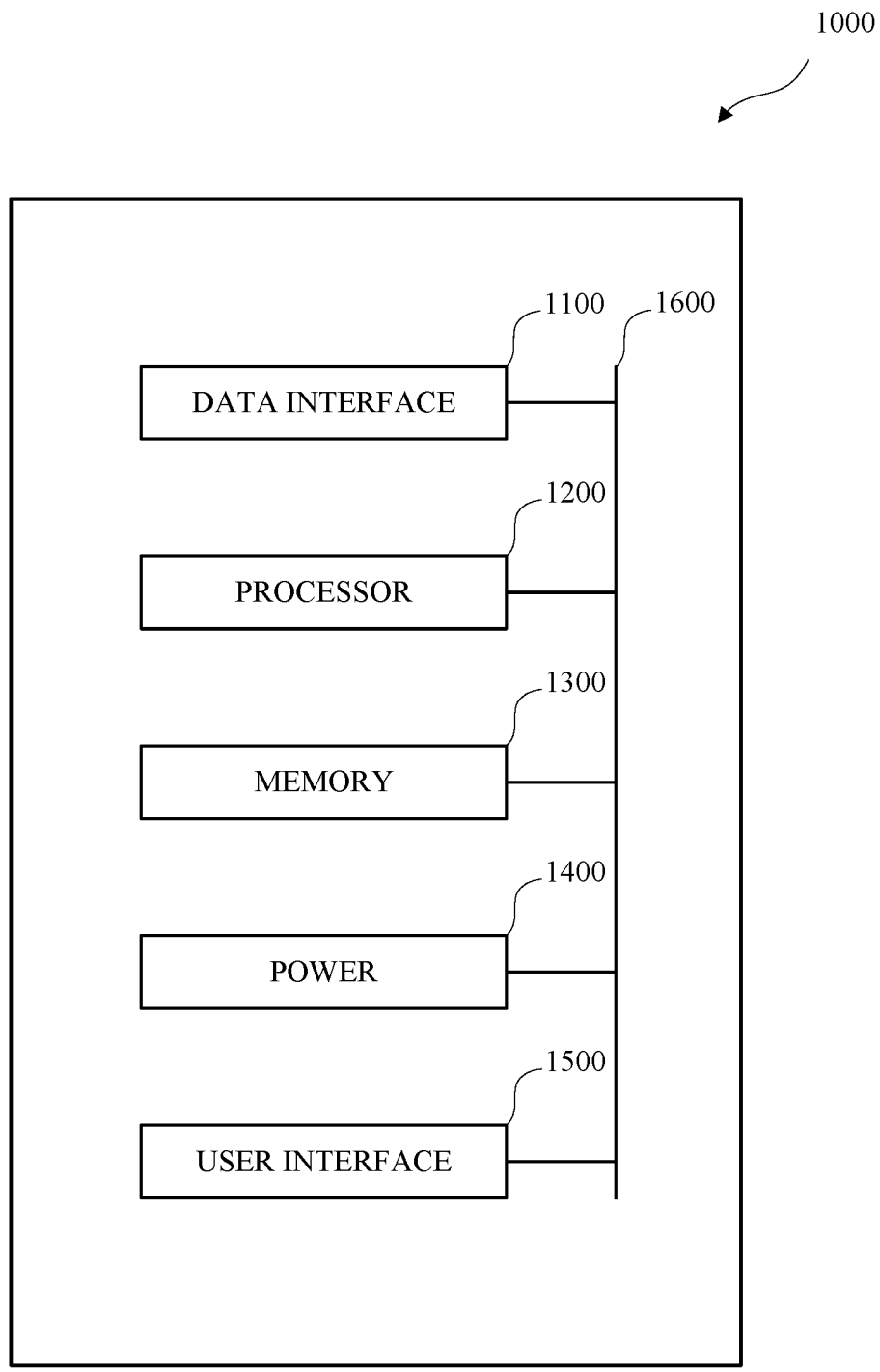
FIG. 1 is a block diagram of an example of a computing device.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a server, a workstation, a minicomputer, or a mainframe computer. In some implementations, the computing device 1000 is a mobile device, such as a mobile telephone, a personal digital assistant (PDA), a laptop, or a tablet computer.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communication links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, information, such as to an operator of the computing device 1000, such as a human user The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
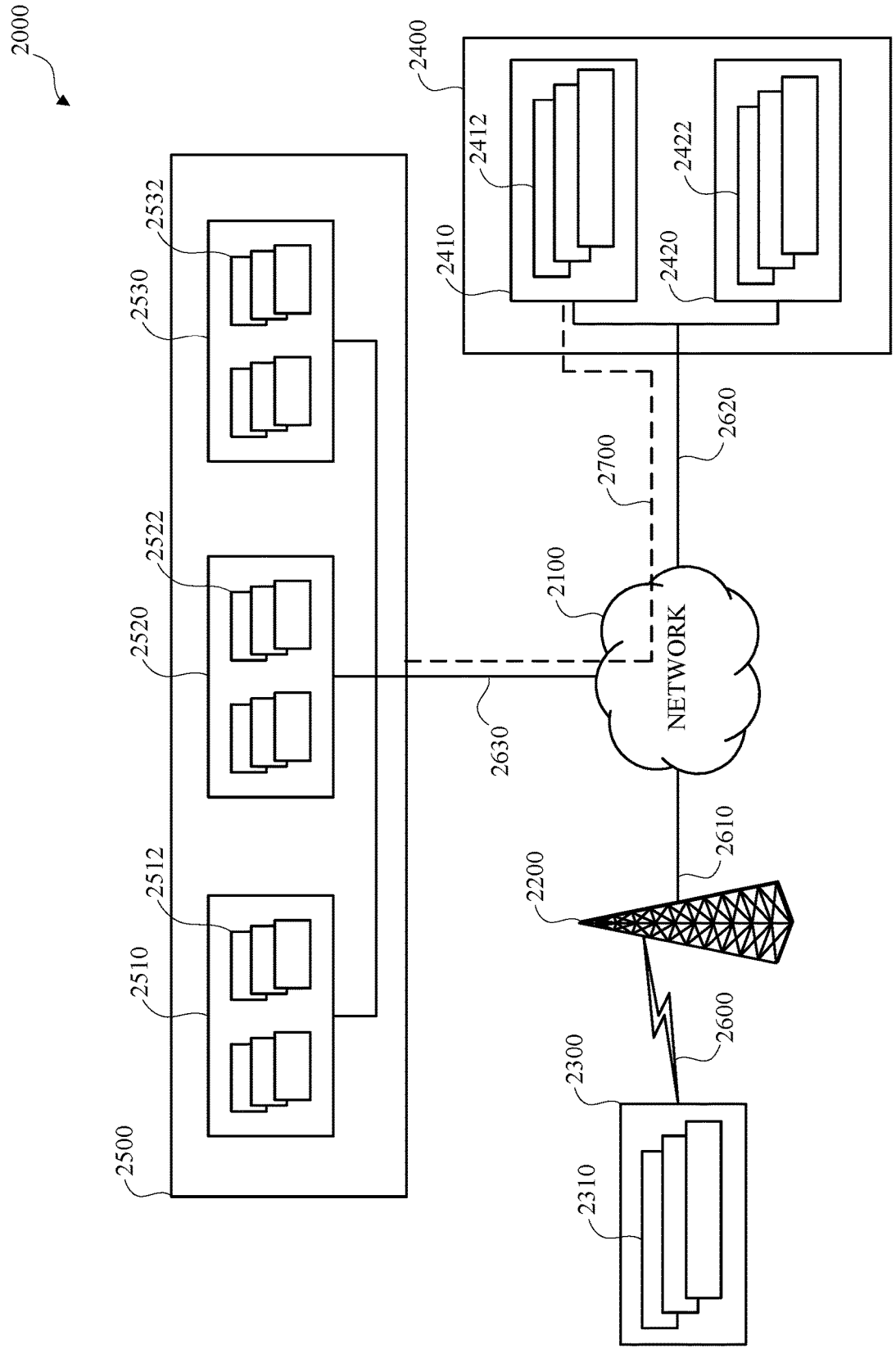
FIG. 2 is a block diagram of an example of a computing and communications system.

FIG. 2 is a diagram of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2530 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communication links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2530, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network (VPN). For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 1620, and the third communications link 1630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2530 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2530 may, respectively, be virtual devices operating on shared physical resources.

Figure 3:
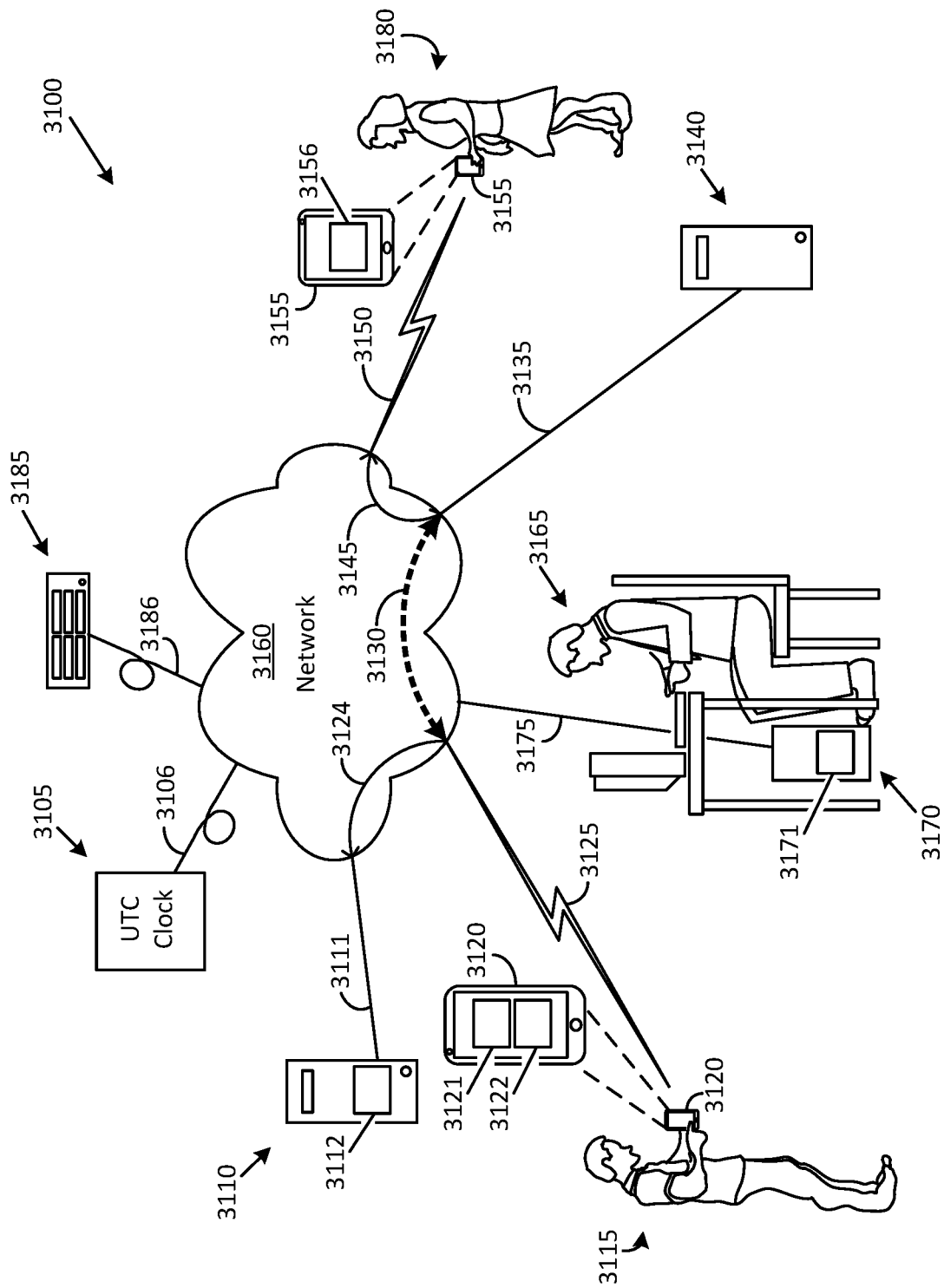
FIG. 3 shows an example clock management system in accordance with an embodiment of the disclosure.

FIG. 3 shows an example clock management system 3100 in accordance with an embodiment of the disclosure. In the example configuration shown in FIG. 3, the clock management system 3100 has a distributed architecture where various components of the clock management system 3100 are provided in various example devices. The example devices include a first client device 3120 used by a first individual 3115 (a user of the first client device 3120), a second client device 3170 used by a second individual 3165 (a user of the second client device 3170), a third client device 3155 used by a third individual 3180 (a user of the third client device 3155), a first computer 3140 configured to support virtual private network (VPN) services, a second computer 3110 configured to provide various service (such as, for example, data evaluation services), a reference clock 3105 (a UTC clock source or a GMT clock source, for example), and a cloud storage element 3185.

The various devices are communicatively coupled to each other via a network 3160. The network 3160, which can be any of various types of networks such as, for example, a wide area network (WAN), a local area network (LAN), a private network, and/or a public network (such as the Internet), may include various types of communication links (a wired communication link, a wireless communication link, an optical communication link, etc.) and may support one or more of various types of communication protocols (Transmission Control Protocol (TCP), Internet Protocol (IP), Ethernet, Post Office Protocol (POP), Simple Mail Transfer Protocol (SMT), File Transfer Protocol (FTP), Hyper Text Transfer Protocol (HTTP), and Hyper Text Transfer Protocol Secure (HTTPS), etc.)

In the illustrated scenario, the first client device 3120 is coupled to the network 3160 via a wireless link 3125 (a cellular link in this case), the second client device 3170 is coupled to the network 3160 via a wired link 3175 (a TCP/IP link, for example), the third client device 3155 is coupled to the network 3160 via a wireless link 3150 (a cellular link in this case), the first computer 3140 is coupled to the network 3160 via a wired link 3135 (a high-speed data link, for example), the second computer 3110 is coupled to the network 3160 via a wired link 3111 (a high-speed data link, for example), the reference clock 3105 is coupled to the network 3160 via an optical fiber link 3106, and the cloud storage element 3185 is coupled to the network 3160 via an optical fiber link 3186.

The first client device 3120 can be any of various types of personal devices used to execute various software applications that involve interacting with computers and other devices via the network 3160. A non-exhaustive list of client devices can include a smartphone, a tablet computer, a phablet (phone plus tablet), a laptop computer, and a wearable device (a smartwatch, for example). The various client devices can include any of various operating systems and platforms such as, for example, a Windows operating system, an Android operating system, an iOS operating system, a Mac operating system, and a Linux operating system.

In the illustrated scenario, the first client device 3120 is a hand-held device (a smartphone, for example) that is used by the first individual 3115 for executing various software applications. At least some of these software applications can include actions performed via a Web browser such as, for example, Google Chrome®, Microsoft Edge®, and Mozilla Firefox®.

In an example operation in accordance with the disclosure, the first client device 3120 is used by the first individual 3115 to interact with the third client device 3155 via a VPN link 3130 that is supported by the first computer 3140. Accessing and using the VPN link 3130 may be carried out via a software application 3121 that is provided in the first client device 3120. In one scenario, the software application 3121 may be downloaded from a server computer (such as, for example, the first computer 3140 or the second computer 3110).

The third client device 3155 can be any of various types of personal devices used to execute various software applications that include operations involving interactions with computers and other devices via the network 3160. A non-exhaustive list of personal devices can include a smartphone, a tablet computer, a phablet (phone plus tablet), a laptop computer, and a wearable device (a smartwatch, for example).

In the illustrated scenario, the third client device 3155 is a hand-held device (a tablet computer) that is used by the third individual 3180 for executing various software applications. At least some of these software applications can include actions performed via a Web browser such as, for example, Google Chrome®, Microsoft Edge®, and Mozilla Firefox®.

In an example operation in accordance with the disclosure, the third client device 3155 is used by the third individual 3180 to interact with the first client device 3120 via the VPN link 3130. Accessing and using the VPN link 3130 may be carried out via a software application 3156 that is provided in the third client device 3155. In one scenario, the software application 3156 may be downloaded from a server computer (such as, for example, the second computer 3110). In an example implementation, the second computer 3110 evaluates various operations carried out by the third individual 3180 upon the software application 3156.

The second client device 3170 used by the second individual 3165 can be any of various types of devices including a personal computer, a desktop computer, or a laptop computer. In an example operation in accordance with the disclosure, the second client device 3170 is used by the second individual 3165 to interact with the first client device 3120 and/or the third client device 3155 (either directly or via the VPN link 3130). Accessing and using the VPN link 3130 may be carried out via a software application 3171 that is provided in the second client device 3170. In one scenario, the software application 3171 may be downloaded from a server computer (such as, for example, the second computer 3110). In an example implementation, the second computer 3110 evaluates various operations carried out by the second individual 3165 upon the software application 3171.

The first computer 3140 can be any of various types of devices including a desktop computer, a personal computer, or a laptop computer. The first computer 3140 can include a processor and a memory containing computer-executable instructions. The processor is configured to access the memory and execute the computer-executable instructions to perform various operations in accordance with the disclosure. In an example implementation in accordance with the disclosure, the first computer 3140 is configured as a server computer having server software and hardware that enables the first computer 3140 to perform various server-related functions. The server-related functions can include responding to a request made by a client device by providing a requested service. A non-exhaustive list of services provided by the first computer 3140 can include web services (providing access to web pages, for example), email services (propagating emails, for example), file transfer services (transferring files a using file transfer protocol (ftp), for example), identity services (supporting login and security to users). More particularly, in an example implementation in accordance with the disclosure, the first computer 3140 is configured to support VPN services. In this case, the first computer 3140 includes VPN software that provides anonymity to communications exchanged between two or more client devices.

In an example scenario, the first individual 3115 executes the software application 3121 to request information transfer between the first client device 3120 and the third client device 3155 by use of a virtual private network. The software application 3121 sets up the VPN link 3130 for transferring information through the network 3160 using a suitable VPN transmission protocol such as, for example, Internet Protocol Security (IPsec) protocol, Layer 2 Tunneling Protocol (L2TP) protocol, Secure Sockets Layer (SSL) protocol, Transport Layer Security (TLS) protocol, Point-to-Point Tunneling Protocol (PPTP), Secure Shell (SSH) protocol, Secure Socket Tunneling Protocol (SSTP), Internet Key Exchange, Version 2 (IKEv2), and Open VPN.

In one aspect of the information exchange, the first computer 3140 receives a piece of information from the first client device 3120 via the VPN link 3130, in the form of an IP packet, for example. The first computer 3140 may examine a header portion of the IP packet if so desired and identify an IP address of the first client device 3120. The first computer 3140 forwards the IP packet to the third client device 3155 (via a communication link 3145) without including the IP address of the first client device 3120. The third client device 3155 receives the IP packet having an IP address of the first computer 3140 in a header portion. Hiding the IP address of the first client device 3120 from the third client device 3155 not only prevents the third client device 3155 from identifying the first client device 3120 but also provides security against snooping during transit of the IP packet through the network 3160. In some cases, the snooping may be directed at obtaining the IP address of the first client device 3120 and using the IP address to launch malware attacks upon the first client device 3120. Hiding the IP address of the first client device 3120 via use of the VPN link 3130 can thwart such an attack.

Information transmitted by the third client device 3155 to the first client device 3120 can be similarly granted privacy by use of the software application 3156 in the third client device 3155, by a VPN tunnel (not shown, between the third client device 3155 and the first computer 3140), and by the first computer 3140 in the manner described above with respect to the first client device 3120.

The second computer 3110 may be any of various types of computers that provide various functionalities. In an example scenario, the second computer 3110 is configured as a server computer having server software and hardware that enables the second computer 3110 to perform various server-related functions. The server-related functions can include responding to a request made by a client device by providing a requested service. A non-exhaustive list of functions and services provided by the second computer 3110 can include web services (providing access to web pages, for example), email services (propagating emails, for example), file transfer services (transferring files a using file transfer protocol (ftp), for example), identity services (supporting login and security to users), software application hosting services, and software application support services (for example, to allow downloading of various software applications to various client devices).

More particularly, in an example implementation in accordance with the disclosure, the second computer 3110 is configured to provide various types of data evaluation services, data handling services, and/or data forwarding services. In an example procedure in accordance with an embodiment, the second computer 3110 is provided with a software application 3112 that enables the second computer 3110 to receive information about one or more actions performed by the first individual 3115 upon the first client device 3120 and/or actions executed by the first client device 3120. The actions executed by the first client device 3120 (specifically, by a processor of the first client device 3120) can be either autonomous actions or can be carried out in response to actions performed by the first individual 3115.

Some example actions that can be performed by the first individual 3115 upon the first client device 3120 may include execution of a procedure (clicking on an icon to access a web page, clicking on an icon to send an email, etc.), performing an action associated with a utility (generating a document in Microsoft Word®, drafting an email, interacting with a social media application, etc.), and performing an action upon the first client device 3120 (terminating a session, opening a file, moving a file in a folder, deleting a folder, rebooting, activating a key on a keyboard, moving a mouse, toggling between windows, scrolling, page up/down, etc.). An example action that may be executed by the first client device 3120 (either autonomously or in response to actions performed by the first individual 3115) can be associated with an operating system of the first client device 3120.

The first client device 3120 may characterize/describe each of such example actions in a form referred to herein, as an event, and propagate information pertaining to the event to the second computer 3110 for evaluation. The information may be received from the first client device 3120, via a communication link 3124, in various forms, formats, and protocols. At least some of the various forms, formats, and protocols are specifically provided in accordance with the disclosure.

In an example scenario in accordance with the disclosure, the second computer 3110 may execute the software application 3112 to carry out various actions upon the information received from the first client device 3120. The various actions carried out by the second computer 3110 by use of the software application 3112 are generally directed at evaluating the received information for various purposes.

In one example scenario, evaluating the received information can involve performing data analytics upon the information in order to identify certain types of information, particularly information associated with time parameters. Performing data analytics upon the information may include a filtering procedure to identify and select certain types of information that can be stored in a storage element such as, for example, the cloud storage element 3185.

The information may be stored for various periods of time such as, for example, short-term storage for short term use and long-term storage for historical archival purposes. Short term storage can include, for example, storing a history of various sites visited by the first individual 3115 or details associated with financial transactions carried out by the first individual 3115 over a certain period of time (credit card transactions carried out during a month, for example). Long-term storage can include, for example, storing financial information that may be needed by the first individual 3115 for tax purposes on an annual basis.

In the example scenario described above, the information can be time-sensitive such as for example, a first financial transaction that is associated with a first date in one month and a second financial transaction that is associated with a second date in another month. Accordingly, the information provided by the first client device 3120 to the second computer 3110 for evaluation by the software application 3112 can include time information associated with each financial event. The time information may be derived by means of a local clock 3122 in the first client device 3120. The local clock 3122 may, or may not, be synchronized with the reference clock 3105.

Information propagated by the first client device 3120 to the second computer 3110 via the communication link 3124 may be formatted in the form of data bundles that include timestamp information in accordance with the disclosure. Further details pertaining to data bundles that include timestamp information are provided below.

The second computer 3110 may use the timestamp information to evaluate the time-sensitive information. In some cases, the timestamp information provided by the first client device 3120 to the second computer 3110 may be inaccurate such as, for example, due to an inaccuracy in the local clock 3122 used by the first client device 3120. Consequently, in accordance with the disclosure, the second computer 3110 may evaluate the timestamps provided by the first client device 3120 by use of the reference time standard and modify the timestamps if the timestamps are inaccurate. The reference time standard may be provided by the reference clock 3105.

In another example scenario, evaluating the information received by the second computer 3110 from the first client device 3120 can involve application of a time shift to at least some of the information contained in a data bundle, particularly, time-reliant information. The time shift can be selected to compensate for an inaccuracy in the local clock 3122. For example, the second computer 3110 may determine that a positive time shift (5 seconds, for example) has to be applied to at least a portion of the information contained in a data bundle based on the second computer 3110 identifying a negative time offset as a result of the local clock 3122 running behind the reference clock 3105 (by 5 seconds, in this example). The portion of the information contained in the data bundle to which the time shift is applied may include, for example, one or more timestamps and/or one or more descriptions of events contained in the data bundle. An example description that corresponds to an action performed by the first individual 3115 on the first client device 3120 can be "request sent." In this example, a positive time shift may be applied to a timestamp corresponding to the "request sent" description.

In some cases, evaluating the information may involve performing data analytics upon the information. In an example operation, the data analytics may be performed in order to identify and/or characterize various the actions performed by the first individual 3115 upon the software application 3121. The various characteristics of the actions performed by the first individual 3115 upon the software application 3121 may be compared against characteristics of actions performed by other individuals upon similar software applications. Results of the data analytics can be used in various ways. In one case, the results may be used to modify, improve, and/or develop, software applications such as, for example, the software application 3121.

Performing data analytics upon the information received from the first client device 3120 can include obtaining information from various other client devices that may be used for executing the same software, similar software, or different software. Some aspects of the data analytics can include evaluating time-related information such as, for example, comparing an operation performed by the first individual 3115 upon the first client device 3120 to an operation performed by the third individual 3180 upon the third client device 3155 and/or an operation performed by the second individual 3165 upon the second client device 3170.

In an example scenario, the operation performed by the first individual 3115 and another individual such as, for example, the third individual 3180, can be time-critical. Some such operations can include, for example, a stock trade, an online betting operation, and an online bidding operation (auction, eBay®, etc.). Determining a winner of an auctioned item during an online auction, for example, may involve comparing a bid by the first individual 3115 located in a first geographic location against a bid by the third individual 3180 who may be located in a different geographic location. The comparison has to be based upon a time of placement of each competing bid, and any inaccuracy, if present, in the local clock 3122 of the first client device 3120 used by the first individual 3115 and/or in a local clock of the third client device 3155 used by the third individual 3180. The second computer 3110 can be configured to provide such services in accordance with the disclosure.

Information propagated by the first client device 3120 to the second computer 3110 via the communication link 3124, and in accordance with the disclosure, is formatted in the form of data bundles that include timestamp information. In some cases, the timestamp information provided by the first client device 3120 to the second computer 3110 may be inaccurate such as, for example, due to an inaccuracy in the local clock 3122. Consequently, in accordance with the disclosure, the second computer 3110 may use a reference time standard such as, for example, the reference clock 3105, to evaluate the timestamps provided by the first client device 3120 and to modify the timestamps if the timestamps are inaccurate.

Ensuring the accuracy of the timestamps received from the first client device 3120 (and/or from another client device such as, for example, the third client device 3155) enables the second computer 3110 to accurately evaluate, for example, a sequence of operations associated with a VPN-based communication exchange session between the first client device 3120 and the third client device 3155 by use of the software application 3121.

The sequence of operations can include, for example, a query sent by the first client device 3120 to the third client device 3155 and a response provided by the third client device 3155 to the first client device 3120. In an example scenario, an erroneous timestamp provided by the first client device 3120 to the second computer 3110 can inaccurately indicate to the second computer 3110 that the response provided by the third client device 3155 to the first client device 3120 preceded the request transmitted by the first client device 3120 to the third client device 3155. Evaluating and correcting the timestamp provided by the first client device 3120 in accordance with the disclosure, may address this issue.

Figure 4:
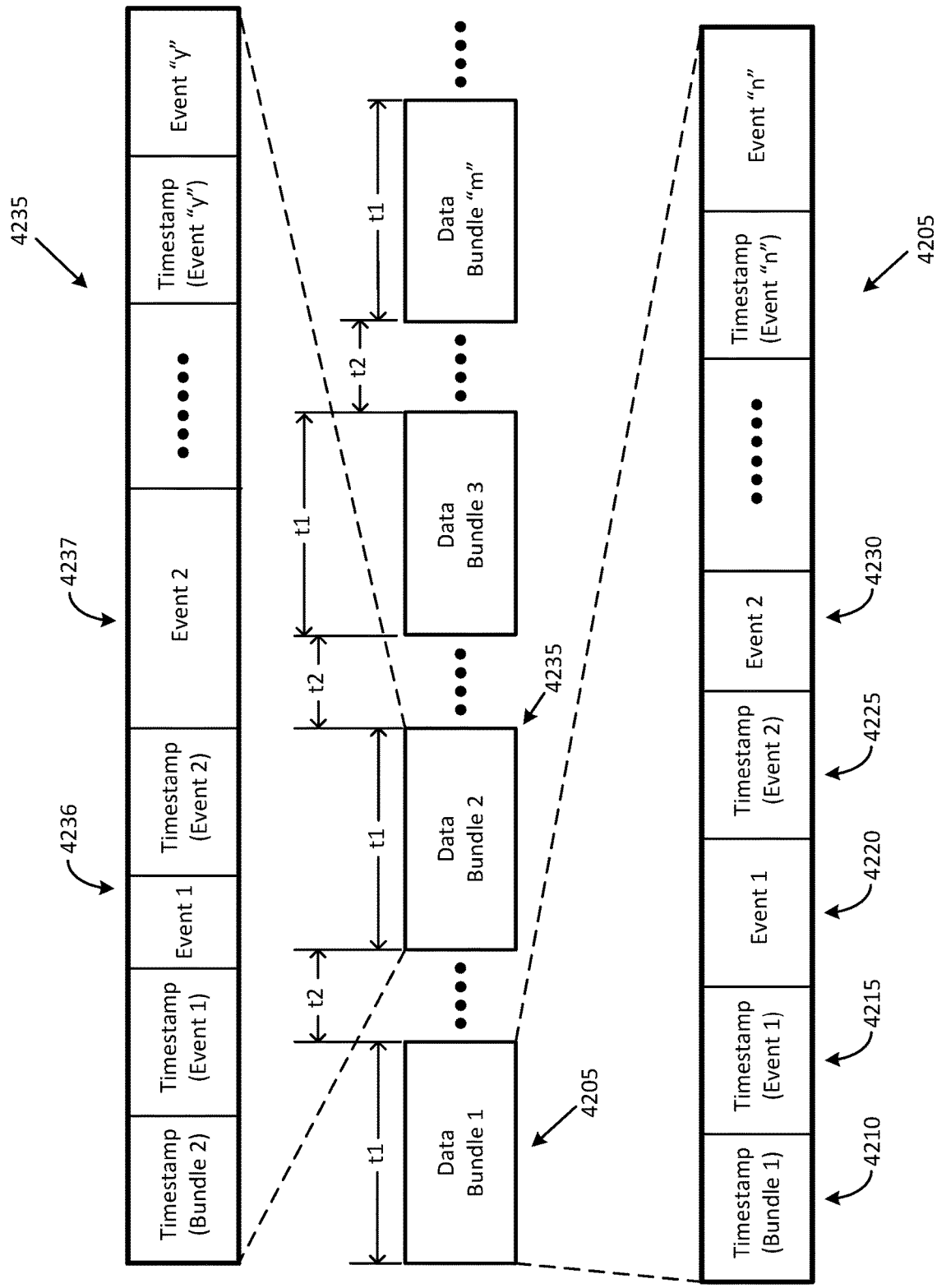
FIG. 4 shows a first example format for transporting data bundles that include timestamp information in accordance with the disclosure.

FIG. 4 shows a first example format for transporting data bundles that include timestamp information in accordance with the disclosure. In an example scenario, the data bundles are propagated from the first client device 3120 to the second computer 3110 via the communication link 3124 in a transport format other than VPN, such as, for example, in a TCP/IP transport format that includes an IP address of the first client device 3120. The second computer 3110 can identify the first client device 3120 by examining a header portion of an IP packet in order to identify the IP address of the first client device 3120.

In the example implementation illustrated in FIG. 4, each data bundle can include one or more IP packets carrying information about one or more events that occur in the first client device 3120 and timestamp information corresponding to the occurrence of the events.

A first data bundle 4205 ("Data Bundle 1") can provide information pertaining to "n" events. A first event 4220 ("Event 1") of the "n" events is associated with an action performed by the first individual 3115. The action may be performed by use of a software application (such as, for example, the software application 3121) and/or by a utility provided in the first client device 3120 (an operating system, a browser, an email service, etc.). In an example scenario, the first event 4220 is a request initiated by the first individual 3115 via the software application 3121 for establishing a VPN connection. The VPN connection may be used to communicate with the third client device 3155 via the VPN link 3130.

Information pertaining to the first event 4220 may be generated by a processor (not shown) in the first client device 3120. The generated information can, for example, be a description of the first event 4220 (for example, "request sent," "request icon activated," etc.) and/or any other information associated with the first event 4220 (for example, identity information of first individual 3115, password information, etc.).

The processor also generates a first timestamp 4215 ("Timestamp (Event 1)") that provides an indication of a time of occurrence of the first event 4220. In an example implementation, the first timestamp 4215 is provided in the form of a UNIX timestamp. In another example implementation, the first timestamp 4215 is provided in conformance with a known standard, such as, for example, the ISO 8601 Standard, the ANSI INCITS 30-1997 (R2008) standard, or the NIST FIPS PUB 4-2 standard.

The first timestamp 4215 and the first event 4220 are then included in the first data bundle 4205. In an example implementation, each of the first timestamp 4215 and the information pertaining to the first event 4220 is transmitted in the form of an IP packet in a TCP/IP data stream. In another example implementation, each of the first timestamp 4215 and the information pertaining to the first event 4220 is transmitted in the form of a set of digital bits, in any of various transmission formats (including formats used in circuit switched communication systems).

In the illustrated example, the first data bundle 4205 ("Data Bundle 1") provides information about "n" events (n≥1). Of the "n" events, a second event 4230 ("Event 2") pertains to an action performed by the first individual 3115 after performing the action associated with the first event 4220 (request for establishing a VPN connection). This action may be performed by use of the software application 3121, another software application, or a utility provided in the first client device 3120. The second event 4230 can, for example, pertain to initiating a transmission of a message from the first client device 3120 via the VPN link 3130.

The processor in the first client device 3120 creates information pertaining to the second event 4230 (and/or any other information associated with the second event). The processor also generates a second timestamp 4225 ("Timestamp (Event 2)") that provides an indication of a time of occurrence of the second event 4230. The second timestamp 4225 and the second event 4230 are then included in the first data bundle 4205. In an example implementation, the second timestamp 4225 and the information pertaining to the second event 4230 may be transmitted in the form of IP packets in the TCP/IP stream containing the IP packets of the first event 4220 and the first timestamp 4215 or in the form of a set of digital bits.

The procedure described above with respect to the first event 4220 and the second event 4230 can be repeated for "n" events that are included in the first data bundle 4205. The "n" events and associated timestamps may be retrieved from an information buffer provided in the first client device 3120. The information buffer may be used by a processor in the first client device 3120 to store information about "x" events and associated timestamps (x≥1). The information may be stored over any defined period of time such as, for example, 10 minutes, an hour, a day, or a week. The "x" events and associated timestamps are stored in the information buffer in an order that allows for transmission in a sequential pattern corresponding to the sequence of occurrence of the "x" events.

In addition to the timestamps generated for each event, and in accordance with a first embodiment of the disclosure, the first data bundle 4205 includes a first bundle timestamp 4210 ("Timestamp (Bundle 1)") that provides an indication of a time of transmission of the first data bundle 4205 from the first client device 3120.

The processor in the first client device 3120 generates, and places, the first bundle timestamp 4210 in an assigned time-slot in the first data bundle 4205. In the illustrated example, the first bundle timestamp 4210 is placed ahead of the first timestamp 4215 ("Timestamp (Event 1)") in the first data bundle 4205. The first client device 3120 then propagates the first data bundle 4205 to the second computer 3110 via the communication link 3124. The second computer 3110 may utilize the first bundle timestamp 4210 as a part of an evaluation procedure for evaluating the information provided by the "n" events contained in the first data bundle 4205 (n≥1).

In a first example evaluation procedure, the second computer 3110 evaluates the first data bundle 4205 by comparing time information provided by the first bundle timestamp 4210 ("Timestamp (Bundle 1)") against a reference time standard (such as, for example, a time indicated by the reference clock 3105).

In one example implementation, comparing time information provided by the first bundle timestamp 4210 ("Timestamp (Bundle 1)") against the reference time standard can include operations such as, for example, generating a reference timestamp based on the reference time standard provided by the reference clock 3105. The reference timestamp generated by the second computer 3110 can then be compared against the first bundle timestamp 4210 in a comparison procedure that is directed at determining an accuracy of the first bundle timestamp 4210. The comparison procedure can include identifying a propagation time for the first data bundle 4205 through various devices of the network 3160 (switches, routers, etc.). The first bundle timestamp 4210 can be adjusted by the second computer 3110 based, for example, on the propagation time.

In another example implementation, a comparison procedure can include identifying a local time at the location of the first client device 3120 and translating the local time to an equivalent time that can be used for determining an accuracy of the first bundle timestamp 4210 when comparing against the reference standard time provided by the reference clock 3105. The comparison procedure can further include identifying the propagation time for the first data bundle 4205 through various devices of the network 3160 (switches, routers, etc.).

In some cases, a time offset may be present between the time indicated by the first bundle timestamp 4210 and the reference time standard provided by the reference clock 3105. The time offset may be present, for example, due to an inaccuracy in the local clock 3122 of the first client device 3120. The time offset can be a negative offset in one case (when the local clock 3122 is running behind the reference clock 3105) and a positive offset in another case (when the local clock 3122 is running ahead of the reference clock 3105).

Upon detecting a time offset, the second computer 3110 may execute a timestamp adjustment procedure that includes applying the time offset to each of the timestamps contained in the first data bundle 4205. Applying the time offset may involve subtracting an integer value from a timestamp (if the time offset is positive) or adding an integer value to a timestamp (if the time offset is negative). In an example implementation, the timestamp adjustment procedure may be executed only when the time offset exceeds a predetermined threshold value (defined in seconds, minutes, etc.).

The time-adjusted timestamps contained in the first data bundle 4205 may then be used to perform actions upon corresponding events such as, for example, performing data analytics upon the various events. The actions are generally directed at obtaining information about various actions performed by the first individual 3115 upon the software application 3121 and/or performed by use of other elements of the first client device 3120 (browser, operating system, etc.).

The information about the various actions performed by the first individual 3115 may be used in various ways such as, for example, to compare against actions performed by the third individual 3180 upon the third client device 3155, to improve the software application 3121, and/or to selectively archive some portions of the information contained in the first data bundle 4205. In an example implementation, selectively archiving some portions of the information contained in the first data bundle 4205 may involve identifying certain actions that are performed by the first individual 3115 with respect to usage of the software application 3121. Information derived by evaluating these actions may be stored in the cloud storage element 3185 along with similar information obtained with respect to other individuals who use the software application 3121.

In a second embodiment in accordance with the disclosure, the first bundle timestamp 4210 ("Timestamp (Bundle 1)") is omitted from the first data bundle 4205. The first client device 3120 propagates the first data bundle 4205 containing the "n" events and the timestamps associated with the "n" events (minus the first bundle timestamp 4210 ("Timestamp (Bundle 1)") to the second computer 3110 via the communication link 3124.

In this second embodiment, the second computer 3110 executes a timestamp application procedure that involves generating a server timestamp at a time of arrival of the first data bundle 4205 at the second computer 3110 and associating the server timestamp with the first data bundle 4205. The server timestamp, which is generated by the second computer 3110 based on the reference time standard provided by the reference clock 3105, is then used by the second computer 3110 to execute the evaluation procedure described above for evaluating the information provided by the "n" events contained in the first data bundle 4205. In this case, the time offset may be determined by obtaining time information associated with the local clock 3122 of the first client device 3120 in ways other than via the first bundle timestamp 4210 ("Timestamp (Bundle 1).")

The time-adjusted timestamps of the first data bundle 4205 in this second embodiment may be similarly used to perform actions upon corresponding events such as, for example, performing data analytics upon the various events. As indicated above, the actions are generally directed to obtaining information about various actions performed by the first individual 3115 by use of the software application 3121 and/or performed by use of other elements of the first client device 3120 (browser, operating system, etc.).

As indicated above, the first data bundle 4205 ("Data Bundle 1") can provide information pertaining to "n" events. Furthermore, as indicated above, "x" events and associated timestamps can be stored in an information buffer by a processor in the first client device 3120. The information may be stored over any defined period of time such as, for example, 10 minutes, an hour, a day, or a week. The "x" events and associated timestamps are stored in the information buffer in an order that allows for transmission in a sequential pattern corresponding to the sequence of occurrence of the "x" events.

In the example embodiment illustrated in FIG. 4, the number of events "n" that are retrieved by the processor of the first client device 3120 from the information buffer in which the "x" events are stored, may be included in the first data bundle 4205 can vary in accordance with various factors including an assigned time period "t1" (milliseconds, seconds, minutes, hours etc.).

In one case, the time period "t1" is assigned by a person associated with the software application 3121 such as, for example, a software developer, a systems architect, or an administrator. The time period "t1" may also be applied to, and used by, other software applications that are a part of the clock management system 3100 such as, for example, the software application 3171 in the second client device 3170, the software application 3156 in the third client device 3155, and the software application 3112 in the second computer 3110.

FIG. 4 also shows a second data bundle 4235 ("Data Bundle 2") that is propagated by the first client device 3120 to the second computer 3110 after propagation of the first data bundle 4205 ("Data Bundle 1"). A time delay "t2" may be assigned to allow for propagation of the first data bundle 4205 before propagation of the second data bundle 4235. The time delay "t2" (seconds, minutes, hours, days, weeks, etc.) may be assigned by any of various individuals such as, for example, a software developer, a systems architect, or an administrator.

A duration of the time period "t1" assigned to the second data bundle 4235 is the same as the duration of the time period "t1" assigned to the first data bundle 4205. However, the number of events (and associated timestamps) contained in the second data bundle 4235 can be different than the number of events (and associated timestamps) contained in the first data bundle 4205. For example, the second data bundle can contain "y" number of events (and associated timestamps) rather than the "n" number of events (and associated timestamps) contained in the first data bundle 4205. The difference between "y" and "n" (either positive or negative can be attributed to various factors. An example factor may pertain to differences in IP packet lengths (or sets of digital bits) providing information about various events.

For example, a first event 4236 ("Event 1") in the second data bundle 4235 ("Data Bundle 2") is characterized by a first number of data bits contained in an IP packet having a first packet length and a second event 4237 ("Event 2") is characterized by a second number of data bits contained in an IP packet having a second packet length that is different than the first packet length (longer, in this example) (or in a no-IP format). The packet lengths associated with various events in the first data bundle 4205 ("Data Bundle 2") can vary with respect to each other in a similar manner.

The first data bundle 4205 and the second data bundle 4235 can be followed by "m" data bundles over a period of time (days, weeks, months, etc.) and in conformance with the assigned periodicity that is embodied by timing parameters such as "t1" and "t2." The number of events conveyed in any two of the "m" data bundles can be different from one another. In an example implementation, the first client device 3120 may propagate the data bundles to the second computer 3110 only when the first client device 3120 is online and discontinue doing so when offline.

The periodicity format ("t1," "t2" etc.) of the various data bundles that is described above, may be referred to in accordance with the disclosure as a fixed-duration data bundle propagation format.

The fixed-duration data bundle propagation format may be generally characterized as using a pre-assigned time period ("t1") for transmission of each data bundle (set of IP packets, for example) and a preassigned time period "t2" separating transmission of any two sequential data bundles. The time period "t1" and the time period "t2" can encompass any of various time periods (milliseconds, seconds, minutes, hours etc.). and can be assigned by various entities (designer, administrator, user, etc.) based on various factors (type of software application, type of usage of the software application, online transmission availability, etc.).

Figure 5:
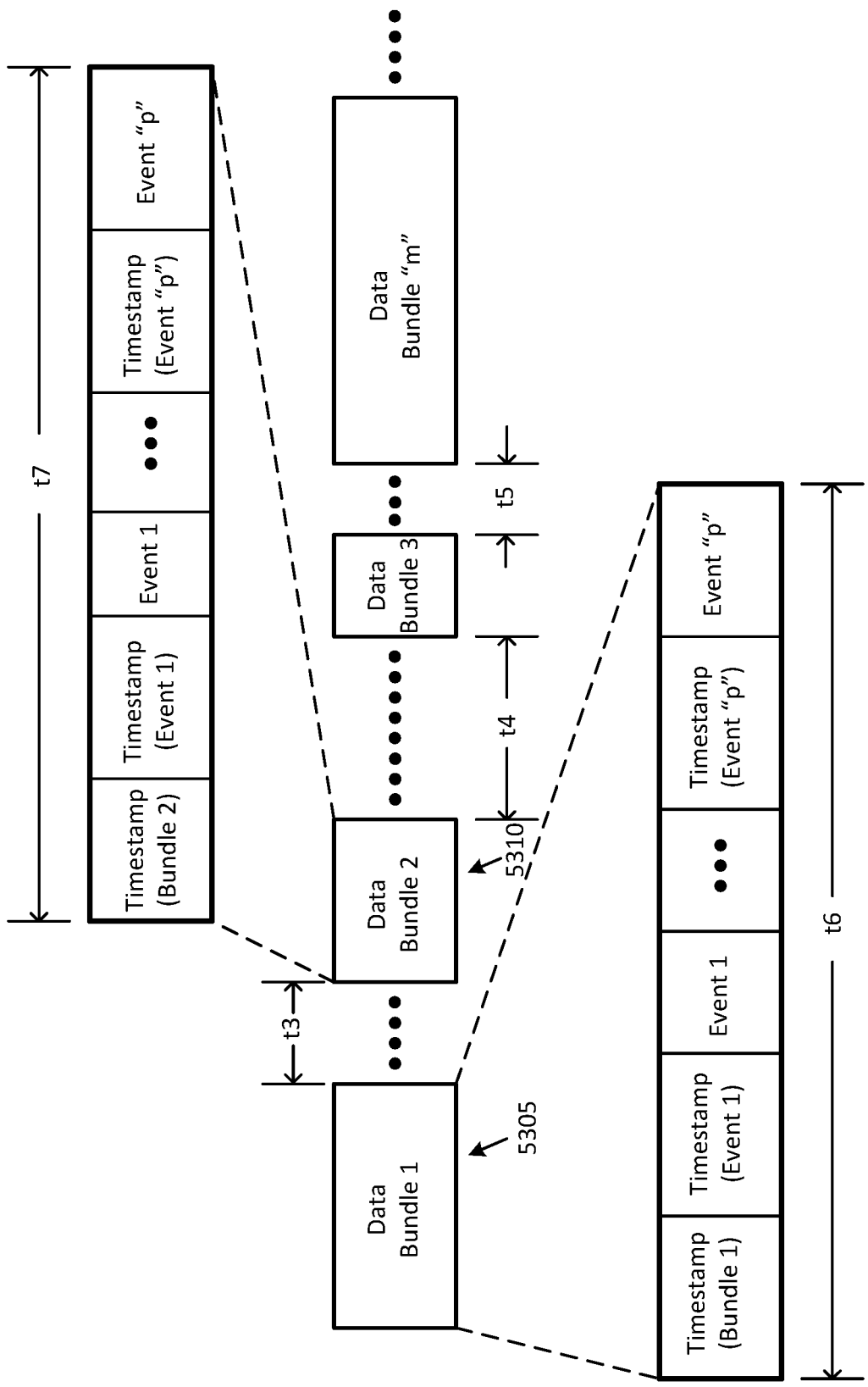
FIG. 5 shows a second example format for transporting data bundles that include timestamp information in accordance with the disclosure.

FIG. 5 shows a second example format for transporting data bundles that include timestamp information in accordance with the disclosure. In an example scenario, the data bundles are propagated from the first client device 3120 to the second computer 3110 via the communication link 3124 in a transport format other than VPN, such as, for example, in a TCP/IP transport format that includes an IP address of the first client device 3120. The second computer 3110 can, if so desired, identify the first client device 3120 by examining a header portion of an IP packet to obtain the IP address of the first client device 3120.

The format of the data stream in this embodiment may be referred to in accordance with the disclosure as a fixed-count data bundle propagation format.

The fixed-count data bundle propagation format may be generally characterized as a format wherein a pre-assigned number of events (and associated timestamps) are transmitted using data bundles extending over varying periods of time. Each of the various periods of time may be automatically defined in part by the number of data bits containing information about an event. For example, a first event may be defined using a first number of data bits and a second event defined by a second number of data bits that is different than the first number of data bits (fewer or larger number of data bits).

In the example scenario shown in FIG. 5, the first data bundle 5305 can extend over a time period "t6" based on the characteristics of the information associated with each of "p" events. In a first example implementation, a number of data bits associated with a first event among the "p" events may be different than a number of data bits associated with a second event among the "p" events (fewer or larger number of data bits). The period "t6" encompasses "p" events, each of which can have various number of data bits.

The second data bundle 5310 ("Data Bundle 2") can extend over a time period "t7" based on the characteristics of the information associated with each of "p" events (same number of events as contained in the first data bundle 5305). In an example implementation, a number of data bits associated with a first event among the "p" events in the second data bundle 5310 may be different than a number of data bits associated with a second event among the "p" events (fewer or larger number of data bits). The period "t7," which encompasses "p" events as contained in the first data bundle 5305, is different than the time period "t6" which also encompasses "p" events.

The number of events ("p") can be predefined by various entities (designer, administrator, user, etc.) and the software application 3121 can be configured to fetch "p" events from the information buffer in which "x" events are stored (p≤x) after a previous data bundle containing "p" events has been transmitted.

Accordingly, the second data bundle 5310 can be configured and transmitted after a time delay "t3" from a conclusion of transmission of the first data bundle 5305. In one example implementation, the time delay "t3" may be pre-assigned and used repetitively in the same manner for subsequent data bundle transmissions. In another example implementation, the time delay between transmission of any two sequential data bundles can vary. In the illustrated example, the time delays "t4" and "t5" is different than the time delay "t3."

Figure 6:
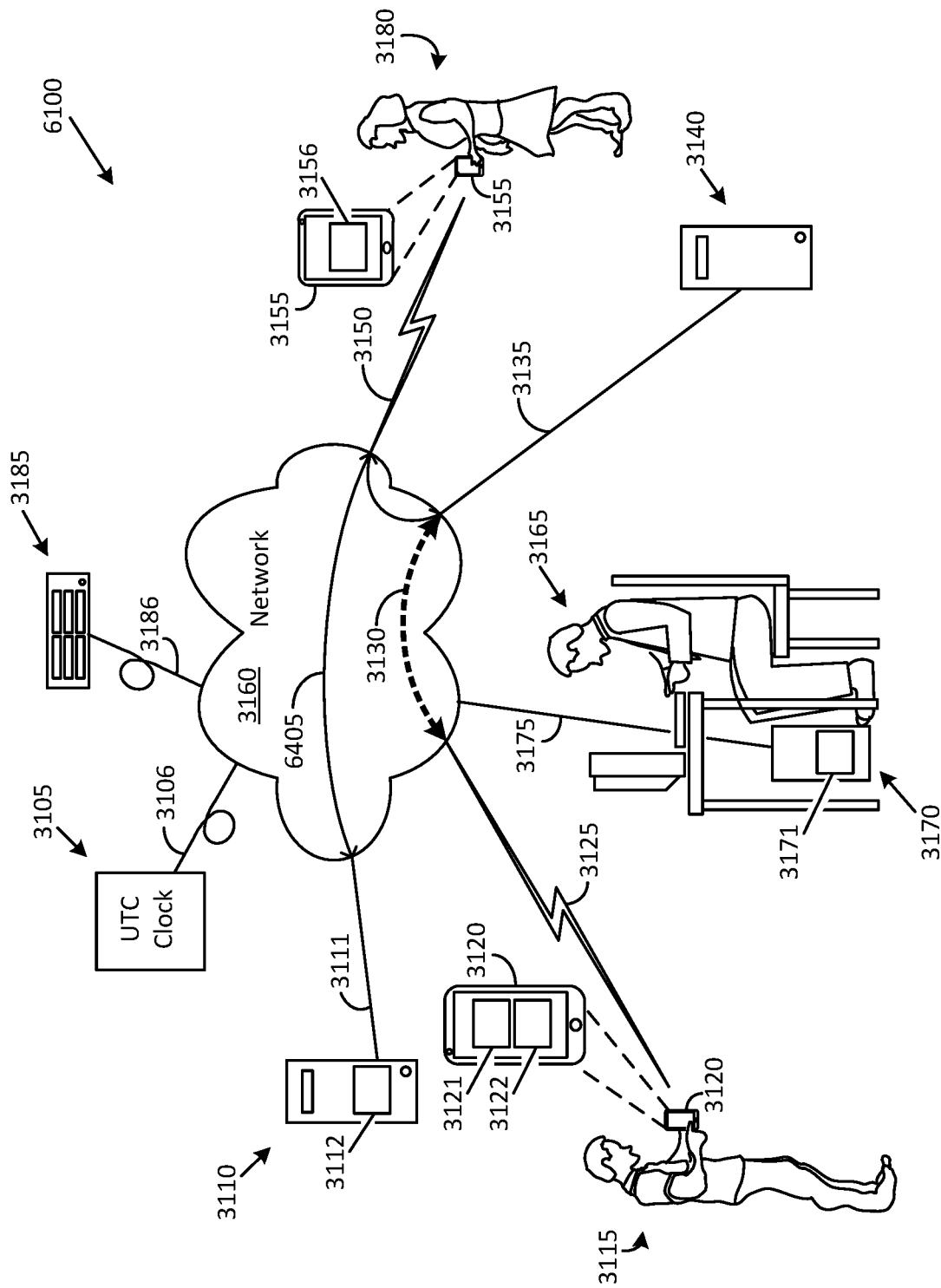
FIG. 6 shows another example clock management system in accordance with another embodiment of the disclosure.

FIG. 6 shows an example clock management system 6100 in accordance with another embodiment of the disclosure. The clock management system 6100 differs from the clock management system 3100 (described above) in terms of the manner in which data bundles are propagated from the first client device 3120 to the second computer 3110. The transmission of data bundles in the clock management system 3100 provides identification information about the first client device 3120 such as, for example, via an IP address of the first client device 3120 when the data bundles are transmitted over the communication link 3124 by use of TCP/IP. The clock management system 6100 provides anonymity to the first client device 3120 such as, for example, when the clock management system 6100 is configured for collecting information from a number of users of various client devices without compromising the privacy of the users.

In this case, the data bundles (such as the ones described above with reference to FIG. 4 and FIG. 5) are propagated to the second computer 3110 via the VPN link 3130. More particularly, the data bundles are propagated from the first client device 3120 to the first computer 3140 in the form of IP packets via the VPN link 3130. The first computer 3140 may, examine a header portion of an IP packet transmitted by the first client device 3120, if desired, and identify an IP address of the first client device 3120. The first computer 3140 forwards the IP packet to the second computer 3110 via the communications link 6405 without including the IP address of the first client device 3120. The second computer 3110 receives the IP packet having an IP address of the first computer 3140 in a header portion. Hiding the IP address of the first client device 3120 from the second computer 3110 not only prevents the second computer 3110 from identifying the first client device 3120 and violating the privacy of the first individual 3115 but also provides security against snooping during transit of the IP packet through the network 3160. In some cases, the snooping may be directed at obtaining the IP address of the first client device 3120 and using the IP address to launch malware attacks upon the first client device 3120. Hiding the IP address of the first client device 3120 via use of the VPN link 3130 can thwart such an attack.

Figure 7:
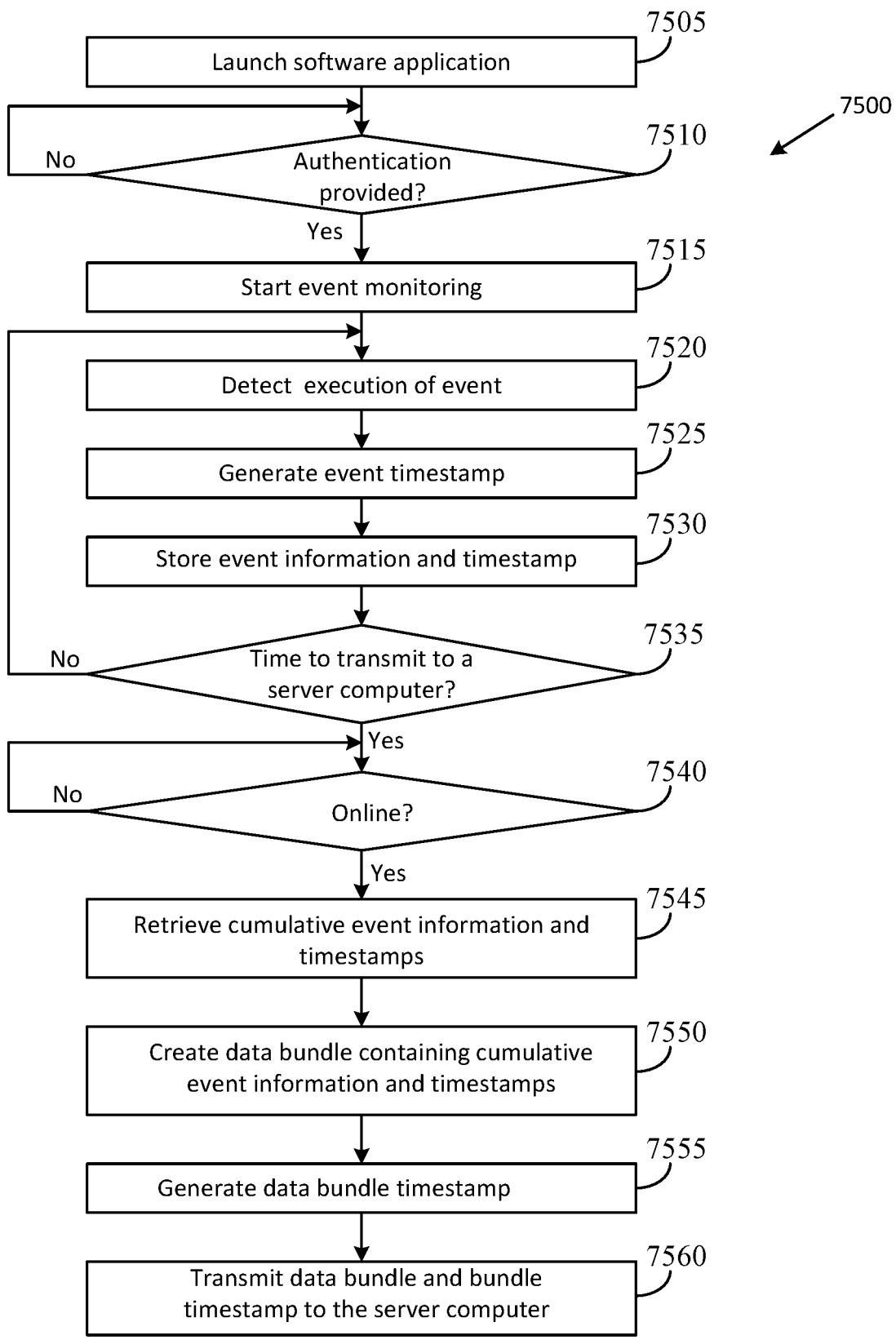
FIG. 7 shows a flowchart of a method to execute a clock management procedure in a client device in accordance with an embodiment of the disclosure.

FIG. 7 shows a flowchart 7500 of a method to execute a timestamp management procedure in a client device in accordance with another embodiment of the disclosure. The method may be implemented in whole or in part by a processor that can be incorporated into the client device. When using a processor, a memory can be included in the client device for storing executable software/firmware and/or executable code and other data associated with the methods and systems disclosed herein.

The first client device 3120 and other elements shown in FIG. 3 through FIG. 6 will be used below as example devices and elements for purposes of description of the flowchart 7500.

At block 7505, a software application, such as, for example, the software application 3121, is launched in the first client device 3120. In an example scenario, the software application 3121 may be downloaded from a computer that is configured to allow downloading of the software application 3121 to multiple users. The software application 3121 cooperates with the software application 3112 provided in the second computer 3110 to permit the second computer 3110 to evaluate various operations carried out by the first individual 3115 upon the software application 3121. In this example scenario, the evaluation operations may be carried out subject to approval being obtained from the first individual 3115. Accordingly, a request for approval may be presented to the first individual 3115, such as, for example, in the form of a legal document that is displayed upon a screen of the first client device 3120 with a check box for providing an indication of approval by the first individual 3115.

In one implementation, the request for approval may be presented in the form of a one-time operation, such as, for example, at a time of installation of the software application 3121 on the first client device 3120. In another implementation, the request for approval may be presented each time the software application 3121 is launched on the first client device 3120.

At block 7510, a determination is made whether the request has been approved. If no approval has been provided, the processor waits for approval and refrains from performing the operations indicated in subsequent blocks of the flowchart 7500.

On the other hand, if approval has been provided, at block 7515, event monitoring is started. As described above, each event can provide information pertaining to an action performed by the first individual 3115 upon the first client device 3120 and/or executed by the first client device 3120 (either autonomously or in response to actions performed by the first individual 3115). Event monitoring generally involves determining if an event-of-interest has been initiated, is occurring, or has occurred. In an example scenario, where the software application 3121 is provided by a VPN service provider, an event-of-interest can pertain to use of the VPN link 3130.

At block 7520, the occurrence of an event is detected such as, for example, the first event 4220 (Event 1) shown in FIG. 4 and described above.

At block 7525, a timestamp is generated with respect to the event (such as, for example, the first timestamp 4215 ("Timestamp (Event 1)" that is generated with respect to the first event 4220, as shown in FIG. 2).

At block 7530, the event and the associated event timestamp are stored in an information buffer. In one case, the information buffer can be used to store information and timestamps associated with "x" events, as described above.

At block 7535 a determination is made whether it is time to transmit the information stored in the information buffer to a server computer. The second computer 3110 is one example of a server computer that is configured to execute actions upon information received from the first client device 3120 (such as, for example, data analytics). Time to transmit the information may vary from one implementation to another such as, for example, between a first implementation where the information is propagated in a fixed-duration data bundle propagation format as described above and a second implementation where the information is propagated in a fixed-count data bundle propagation format as described above.

If it is not yet time to transmit the information, additional information about subsequent events is obtained. The additional information is collected by performing actions indicated in block 7515 through block 7530 in an iterative procedure. The iterative procedure may, for example, provide information about the "n" events and "y" events described above with reference to FIG. 4, and the "p" events described above with reference to FIG. 5.

At block 7540, a determination is made whether the first client device 3120 is online. An online condition allows information to be transmitted into the network 3160. If the first client device 3120 is not online (i.e., is in an offline condition) the first client device 3120 refrains from performing the operations indicated in subsequent blocks of the flowchart 7500, and initiates a monitoring procedure to detect a change in status of the first client device 3120 from offline to online.

If the first client device 3120 is online, at block 7545, cumulative event information such as, for example, the "n" events, "p" events, "y" events described above (along with associated timestamps) is retrieved.

At block 7550, a data bundle is generated, for example, in a manner described above with reference to FIG. 4 and/or FIG. 5.

At block 7555, a data bundle timestamp (such as, for example the bundle timestamp 4210 ("Timestamp (Bundle 1)" shown in FIG. 2) is generated.

At block 7560, the data bundle timestamp is included with the event information and associated timestamps and a data bundle (such as, for example, the first data bundle 4205 shown in FIG. 4) is transmitted by the first client device 3120 to the second computer 3110.

Figure 8:
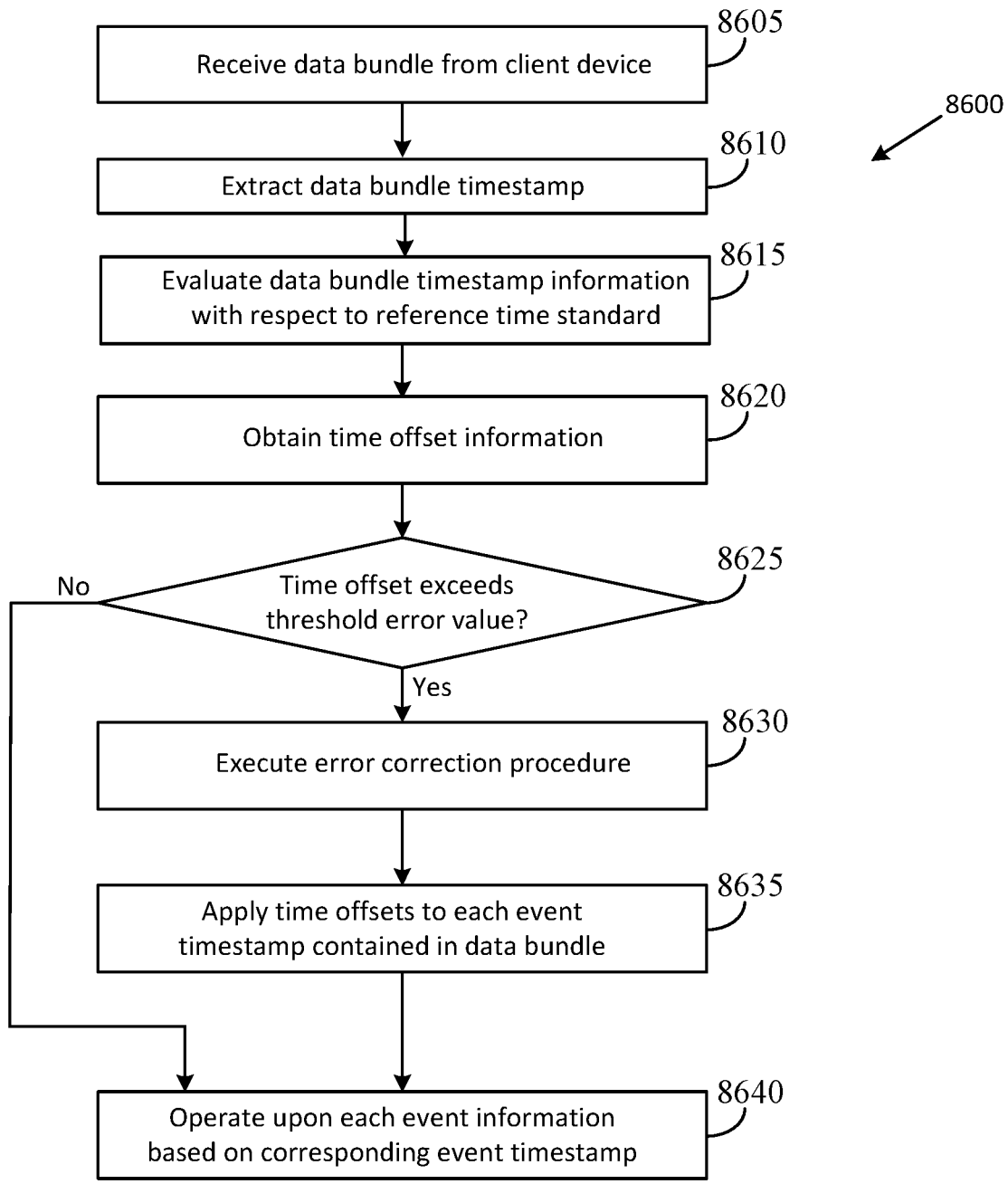
FIG. 8 shows a flowchart of a method to execute a clock management procedure in a server computer in accordance with an embodiment of the disclosure.

FIG. 8 shows a flowchart 8600 of a method to execute a timestamp management procedure in a server computer in accordance with another embodiment of the disclosure. The method may be implemented in whole or in part by a processor that can be incorporated into the server computer. When using a processor, a memory can be included in the server computer for storing executable software/firmware and/or executable code and other data associated with the methods and systems disclosed herein.

The second computer 3110, which can be configured as a server computer, and other elements shown in FIG. 3 through FIG. 6, will be used below as example devices and elements for purposes of description of the flowchart 8600.

At block 8605, the second computer 3110 receives a data bundle, such as, for example, the first data bundle 4205 show in FIG. 4. The data bundle may include a bundle timestamp, such as, for example, the first bundle timestamp 4210 ("Timestamp (Bundle 1)").

At block 8610, a software application, such as, for example, the software application 3112 that is executed on the second computer 3110, extracts the bundle timestamp 4210.

At block 8615, the first bundle timestamp 4210 is evaluated. The evaluation can include actions such as comparing time information provided by the bundle timestamp 4210 ("Timestamp (Bundle 1)") against a reference time standard such as provided by the reference clock 3105. Comparing the time information can include identifying a local time at the location of the first client device 3120 and translating the local time to an equivalent time that can be used for comparing against the reference standard time provided by the reference clock 3105. Comparing the time information can also include identifying a propagation time for the first data bundle 4205 through the various devices of the network 3160 (switches, routers, etc.).

At block 8620, a result of the evaluation indicated in block 8615 is obtained. The result can indicate, for example, a time offset between a time indicated by the first bundle timestamp 4210 and the reference clock 3105. The time offset may be present, for example, due to an inaccuracy in the local clock 3122 of the first client device 3120 that was used for generating the first bundle timestamp 4210. The time offset can be a negative offset in one case (when the local clock 3122 is running behind the reference clock 3105) and a positive offset in another case (when the local clock 3122 is running ahead of the reference clock 3105).

At block 8625, a determination is made whether the time offset exceeds a threshold error value. In an example implementation, the threshold error value may be defined and set by any of various entities, such as, for example, a person associated with the software application 3112, a person associated with the software application 3121, a software developer, a systems architect, or an administrator.

In some cases, the threshold error value (fractions of a second, seconds, minutes, hours, days, etc.) may be defined on the basis of the nature of use of the timestamp adjustment procedure. Thus, for example, in one case, the threshold error value may correspond to a few milliseconds when the nature of use is associated with evaluating speed of operations of the first client device 3120 and/or data transmission times. In another case, the threshold error value may correspond to a day, week, or month when the nature of use is associated with calendar events.

If the time offset does not exceed the threshold error value, the operation indicated in block 8640 (described below) is carried out.

However, if the time offset exceeds the threshold error value, at block 8630, an error correction procedure can be executed. The error correction procedure can include, for example, providing an instruction to the first client device 3120 to modify the local clock, and/or the second computer 3110 performing a corrective action.

An example corrective action performed by the second computer 3110 is indicated in block 8635. The corrective action in this example involves applying a time offset to each event contained in the data bundle. For example, corrective action performed by the second computer 3110 on the basis of detecting a time offset in the bundle timestamp 4210 may involve applying the time offset to each timestamp associated with corresponding events in the first data bundle 4205 (first timestamp 4215 ("Timestamp (Event 1)"), second second timestamp 4225 ("Timestamp (Event 2)"), etc.). Applying the time offset may involve subtracting an integer value from a timestamp (if the time offset is positive) or adding an integer value to a timestamp (if the time offset is negative).

At block 8640, operations may be carried on the basis of the information provided by the various timestamps in the data bundle. In an example scenario, data analytics may be applied to the information pertaining to a first event 4220 ("Event 1"), information pertaining to a second event 4230 ("Event 1") and so on. The data analytics may be directed, for example, at obtaining information about various actions performed by the first individual 3115 upon the software application 3121 and/or by use of other elements of the first client device 3120 (browser, operating system, etc.).

Figure 9:
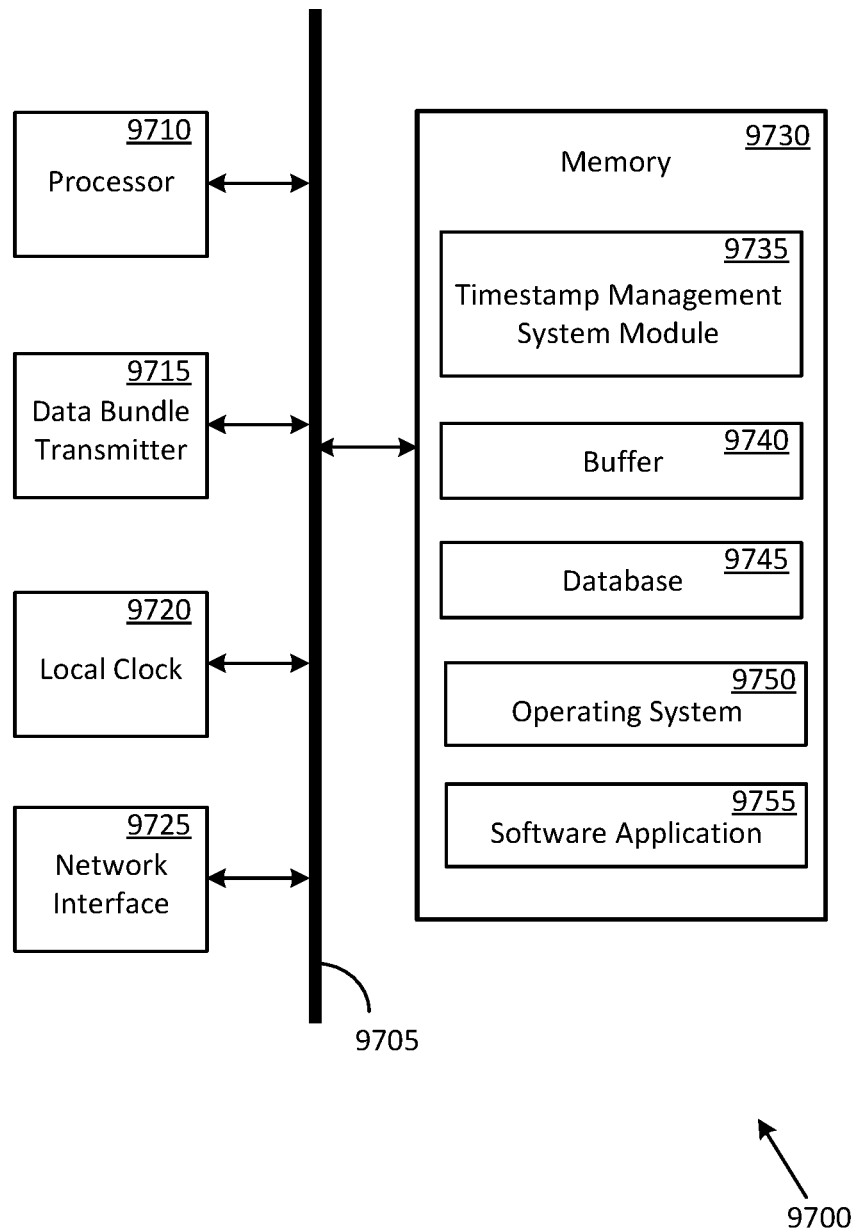
FIG. 9 shows some functional blocks of an example client device that can be used to execute various clock management operations in accordance with the disclosure.

FIG. 9 shows some functional blocks of an example client device 9700 that can be used to execute various clock management operations in accordance with the disclosure. Some example client devices can include the first client device 3120, the third client device 3155, and the second client device 3170. In some implementations, the client device 9700 is a mobile device, such as, for example, the first client device 3120 used by the first individual 3115. A few examples of a mobile device include a mobile telephone, a smartphone, a wearable device (a smartwatch, for example), a personal digital assistant (PDA), and a tablet computer. In some implementations, the client device 9700 is a stationary device, such as, for example, the second client device 3170 used by the second individual 3165. The stationary device can be, for example, a personal computer (PC), a server, a workstation, a minicomputer, or a mainframe computer.

In the example illustration shown in FIG. 9, the client device 9700 includes a processor 9710, a memory 9730, a data bundle transmitter 9715, a local clock 9720, and a network interface 9725 that are communicatively coupled with each other via a bus 9705.

The network interface 9725 can includes component that are used to transmit, receive, or exchange, data (such as, for example, the data bundles described herein) via one or more wired, or wireless, electronic communication mediums, such as a radio frequency (RF) communication medium, a cellular communication medium, an ultraviolet (UV) communication medium, a visible light communication medium, a fiber optic communication medium, a wireline communication medium, or a combination thereof. For example, the network interface 9725 can include a receiver, a transmitter, and/or a transceiver. The network interface 9725 may further include elements (not shown) such as, for example, an antenna for wireless electronic communication, a wired communication port (such as, for example, an Ethernet port or a serial port), a network interface card (NIC), universal serial bus (USB) hardware, Small Computer System Interface (SCSI) hardware, Peripheral Component Interconnect (PCI) hardware, and/or near field communication (NFC) hardware.

The network interface 9725 may be configured to support various types of communication protocols such as, for example, Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), and/or an Institute of Electrical and Electronics Engineers (IEEE) standard protocol.

The processor 9710 can be a single device, a combination of devices, or a system of connected devices, capable of operating upon computer-executable instructions stored in a non-transitory computer-readable storage medium such as the memory 9730. In some implementations, the processor 9710 is implemented as a central processing unit (CPU), such as a microprocessor. In some implementations, the processor 9710 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 9710 may include one or more processing cores. The client device 9700 may further include physical or virtual processing units (collectively, the processor 9710), which may be interconnected, such as via wired, or hardwired, connections, via wireless connections, or via a combination of wired and wireless connections. In some implementations, the processor 9710 is implemented in a distributed configuration including multiple physical devices or units that may be coupled directly or across a network. The processor 9710 includes internal memory (not expressly shown), such as a cache, a buffer, a register, or a combination thereof, for internal storage of data, such as operative data, instructions, or both. For example, the processor 9710 may read data from the memory 9730 into the internal memory (not shown) for processing.

The data bundle transmitter 9715 can include hardware and/or software configured to operate under control of the processor 9710 to format data for transmission out of the client device 9700 via the network interface 9725. In an example operation, the data bundle transmitter 9715 is instructed by the processor 9710 to create data bundles such as, for example, the data bundles shown in FIG. 4 and FIG. 5.

The data bundles created by the data bundle transmitter 9715 can be transmitted through the bus 9705 to the network interface 9725. The network interface 9725 propagates the data bundles to the second computer 3110 in the manner described above.

In another example operation, the data bundle transmitter 9715 is instructed by the processor 9710 to configure data for transmission via a VPN communication link such as, for example, the VPN link 3130 shown in FIG. 3. The data formatted in a VPN format can be transmitted through the bus 9705 to the network interface 9725. The network interface 9725 propagates the data bundles to the first computer 3140, which may be configured to support virtual private network (VPN) services.

The local clock 9720 provides time information that can be used to generate timestamps in the manner described above with reference to the local clock 3122 in the first client device 3120.

The memory 9730 is one example of a non-transitory computer-readable storage medium implemented as a tangible device or component of a device in accordance with the disclosure. The memory 9730 contains, stores, communicates, transports, or a combination thereof, data, such as operative data, instructions, or both. In the illustrated example configuration, the memory 9730 includes a clock management system module 9735, a buffer 9740, a database 9745, an operating system 9750, and a software application 9755.

Computer-executable instructions associated with the clock management system module 9735 may be executed by the processor 9710 to execute various operations in accordance with the disclosure. An example operation involves executing the flowchart 7500 shown in FIG. 7 and described above.

The buffer 9740 can be used to store items such as events and timestamps. In an example operation in accordance with the disclosure, the buffer 9740 can be used to store "x" events, "n" events, "y" events, and/or "p" events described above (along with associated timestamps).

The database 9745 can also be used to store items such as, for example, items associated with VPN communications over the VPN link 3130 (IP address of the first computer 3140, for example), identification information of other client devices, and/or information associated with operations executed upon the client device 9700.

The operating system 9750 can be, for example, a Windows operating system, an Android operating system, an iOS operating system, a Mac operating system, and/or a Linux operating system.

The software application 9755 can be any software application that is provided in the client device 9700 for executing various types of operations. The operations performed via the software application 9755 may be detected and operated upon by the clock management system module 9735 in accordance with disclosure. In an example implementation, the software application 9755 is the software application 3121 provided in the first client device 3120.

Figure 10:
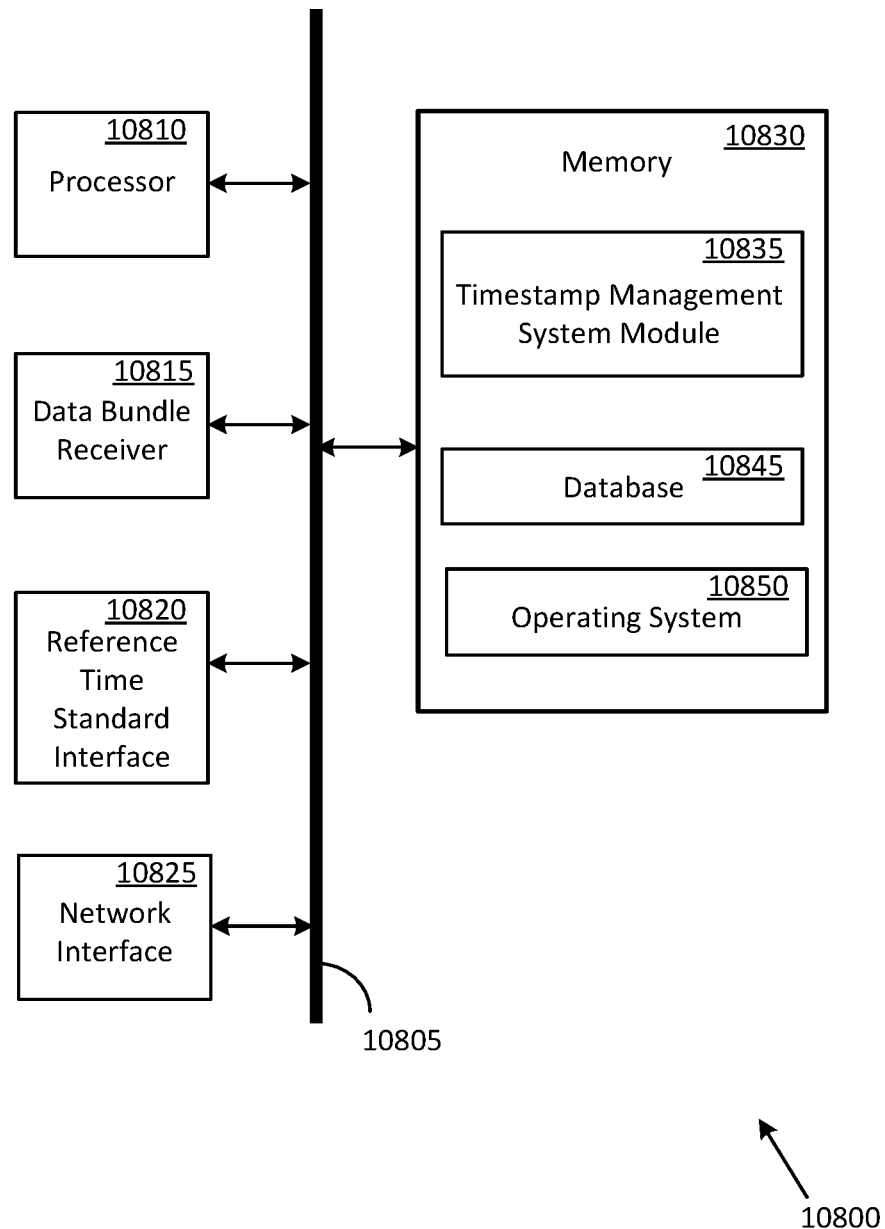
FIG. 10 shows some functional blocks of an example computer that can be used to execute various clock management operations in accordance with the disclosure.

FIG. 10 shows some functional blocks of an example computer 10800, such as the second computer 3110, that can be used to execute various clock management operations in accordance with the disclosure. In this example illustration, the computer 10800 includes a processor 10810, a memory 10830, a data bundle receiver 10815, a reference time standard interface 10820, and a network interface 10825 that are communicatively coupled with each other via a bus 10805.

In some implementations, the computer 10800 is a stationary device, such as, for example, the second computer 3110. The stationary device can be, for example, a personal computer (PC), a server, a workstation, a minicomputer, or a mainframe computer. In some implementations, the computer 10800 can be a mobile device, such as, for example, the third client device 3155 used by the third individual 3180.

The network interface 10825 can include components such as transmitters, receivers, and/or transceivers that enable communications with other network interfaces such as, for example, the network interface 9725 of the client device 9700.

The processor 10810 can be a single device, a combination of devices, or a system of connected devices, capable of operating upon computer-executable instructions stored in a non-transitory computer-readable storage medium such as the memory 10830. In some implementations, the processor 10810 is implemented as a central processing unit (CPU), such as a microprocessor. In some implementations, the processor 10810 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 10810 may include one or more processing cores. The computer 10800 may further include physical or virtual processing units (collectively, the processor 10810), which may be interconnected, such as via wired, or hardwired, connections, via wireless connections, or via a combination of wired and wireless connections. In some implementations, the processor 10810 is implemented in a distributed configuration including multiple physical devices or units that may be coupled directly or across a network. The processor 10810 includes internal memory (not expressly shown), such as a cache, a buffer, a register, or a combination thereof, for internal storage of data, such as operative data, instructions, or both. For example, the processor 10810 may read data from the memory 9730 into the internal memory (not shown) for processing.

The data bundle receiver 10815 can include hardware and/or software that support operations associated with data bundles received from a client device such as, for example, data bundles received from the first client device 3120 in accordance with the disclosure.

The reference time standard interface 10820 may be communicatively coupled via the network interface 10825 with a reference clock source such as, for example, the reference clock 3105 (a UTC clock source, for example).

The memory 10830 is another example of a non-transitory computer-readable storage medium implemented as a tangible device or component of a device in accordance with the disclosure. The memory 10830 contains, stores, communicates, transports, or a combination thereof, data, such as operative data, instructions, or both. In the illustrated example configuration, the memory 10830 includes a clock management system module 10835, a database 10845, and an operating system 10850.

Computer-executable instructions associated with the clock management system module 10835 may be executed by the processor 10810 to execute various operations in accordance with the disclosure. An example operation involves executing the flowchart 8600 shown in FIG. 8 and described above.

The database 10845 can be used to store items such as, for example, items associated with clock management in accordance with the disclosure, (IP address of the first client device 3120, for example), identification information of other client devices, and/or information associated with operations executed upon the second computer 3110.

The operating system 10850 can be, for example, a Windows operating system, an iOS operating system, a Mac operating system, and/or a Linux operating system.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The computer-usable or computer-readable medium may include non-volatile memory, such as a disk drive, or another form of non-volatile memory capable of persistent electronic data storage, such as in the absence of an active power supply. The computer-usable or computer-readable medium may include, or may be implemented as, one or more physical or logical units.

Computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

It must be understood that various words, labels, and phrases are used herein for description purposes and should not be interpreted in a limiting manner. For example, it must be understood that the word "bundle" as used herein refers to digital data that provides various types of information such as, for example, timestamped information about actions performed by an individual, computer-generated data associated with one or software applications, and transport information (header, label, routing information, etc.). The word "timestamp" as used herein refers to a digital representation (a word, a byte, etc.) of an instant in time. The word "VPN" as used herein is an acronym for the label "virtual private network." The word "information" as used herein refers to any of various types of digital data transported by use of any of various types of signal transport formats. It must be understood that the word "memory" as used herein refers to an example non-transitory computer-readable storage medium. The label "client device" as used herein refers to a first device/computer that communicates with a second device/computer to execute various operations in accordance with the disclosure. In various implementations, the second device/computer can be a server computer or another client device.

It must also be understood that words such as "IP packet" and "TCP/IP" are used herein as one example among many different transmission formats that may be used to transfer information between computers in accordance with the disclosure. Thus, for example, the phrase "IP packet" or "packet" as used herein is equally applicable and pertinent to various other sets of digital bits (byte, word, etc.) that may be transmitted in any of various transmission formats, including formats used in circuit switched communication systems.

The word "example" as used herein is intended to be non-exclusionary and non-limiting in nature. One of ordinary skill in the art will understand the principles described herein and recognize that these principles can be applied to a wide variety of applications and situations, using a wide variety of tools, processes, and physical elements. Words such as "implementation," "scenario," "case," "approach," and "situation" must be interpreted in a broad context, and it must be understood that each such word represents an abbreviated version of the phrase "In an example "xxx" in accordance with the disclosure" (where "xxx" corresponds to "implementation," "scenario," "case," "approach," "situation" etc.).

What is claimed is:

1. A method comprising:
   receiving, by a server computer, a data bundle generated by a client device, the data bundle including:
      a description of a first event associated with the client device and a first timestamp corresponding to an occurrence of the first event,
      a description of a second event associated with the client device and a second timestamp corresponding to an occurrence of the second event, and
      a third timestamp corresponding to a time when the data bundle was transmitted by the client device to the server computer;
   obtaining, by the server computer, a reference time standard from a reference clock source communicatively coupled to the server computer via a network interface;
   identifying, by the server computer, based on the third timestamp and the reference time standard, an inaccuracy in a local clock of the client device;
   identifying, by the server computer, a time shift based on the third timestamp, wherein the time shift compensates for the inaccuracy in the local clock of the client device, and wherein identifying the time shift comprises:
      generating, by the server computer, a fourth timestamp corresponding to a time of receipt of the data bundle by the server computer, the fourth timestamp referenced to the reference time standard;
      determining, by the server computer, a time difference between the fourth timestamp and the third timestamp;
      determining, by the server computer, whether the time difference is greater than a threshold error value, wherein whether to apply the time shift to the first timestamp and to the second timestamp is based on whether the time difference is greater than the threshold error value;
      determining, by the server computer, that the time difference is greater than the threshold error value; and
      responsive to determining that the time difference is greater than the threshold error value:
         identifying, by the server computer, the time shift based on the time difference;
         applying, by the server computer, the time shift to the first timestamp corresponding to the occurrence of the first event to obtain a corrected first timestamp;
         applying, by the server computer, the time shift to the second timestamp corresponding to the occurrence of the second event to obtain a corrected second timestamp; and
         sending, by the server computer, an instruction to the client device to correct the inaccuracy in the local clock of the client device.

2. The method of claim 1, wherein the first event is associated with at least one of an action executed by a user upon the client device or an autonomous action executed by the client device in response to the action executed by the user, and wherein the method further comprises:
   performing a data analytics procedure that comprises analyzing the at least one of the action executed by the user upon the client device or the autonomous action executed by the client device in response to the action executed by the user, wherein the data analytics procedure is based on at least one of the corrected first timestamp or the corrected second timestamp.

3. The method of claim 1, further comprising:
   one of modifying, improving, or developing, a software application based on a data analytics procedure based on at least one of the corrected first timestamp or the corrected second timestamp.

4. The method of claim 1, wherein communications between the client device and the server computer are propagated via a second computer that is configured to support virtual private network operations, and wherein the method further comprises:
   obtaining, by the client device, from an individual, an approval to authorize transmitting to the server computer, the data bundle; and
   receiving, by the server computer, via the second computer, the data bundle in a virtual private network format.

5. A system comprising:
   a first computer comprising:
      a first non-transitory computer-readable storage medium; and a first processor configured to execute instructions stored in the first non-transitory computer-readable storage medium to at least:
   receive a data bundle generated by a client device, the data bundle including a first timestamp associated with an occurrence of a first event in the client device, a second timestamp associated with an occurrence of a second event in the client device, and a third timestamp corresponding to a time when the data bundle was transmitted by the client device;
   obtain a reference time standard from a reference clock source that is communicatively coupled to the first computer via a network interface;
   identify, based on the third timestamp and the reference time standard, an inaccuracy in a local clock of the client device;
   in response to a determination that the inaccuracy does not exceed a threshold error value, omit adjusting the first timestamp and the second timestamp; and
   in response to a determination that the inaccuracy exceeds the threshold error value:
      select a time shift based on the third timestamp;
      apply the time shift to the first timestamp to obtain a corrected first timestamp;
      apply the time shift to the second timestamp to obtain a corrected second timestamp; and
      send an instruction to the client device to correct the inaccuracy in the local clock of the client device.

6. The system of claim 5, wherein the first event is associated with at least one of an action executed by a user upon the client device or an autonomous action executed by the client device in response to the action executed by the user, and wherein the first processor is further configured to execute instructions stored in the first non-transitory computer-readable storage medium to:
   perform, upon the data bundle, a data analytics procedure that comprises analyzing the at least one of the action executed by the user upon the client device or the autonomous action executed by the client device in response to the action executed by the user.

7. The system of claim 5, wherein the first processor in the first computer is further configured to execute instructions stored in the first non-transitory computer-readable storage medium to:
   perform a data analytics procedure that comprises comparing a first action performed by a first user upon a first software application to a second action performed by a second user upon a second software application.

8. The system of claim 5, wherein the client device comprises:
   a second non-transitory computer-readable storage medium; and
   a second processor configured to execute instructions stored in the second non-transitory computer-readable storage medium to at least:
      generate the first timestamp corresponding to a time of the occurrence of the first event;
      generate the second timestamp corresponding to a time of the occurrence of the second event;
      generate the third timestamp corresponding to a time of transmission of the data bundle to the first computer; and
      include the first timestamp, the second timestamp, and the third timestamp in the data bundle transmitted to the first computer.

9. The system of claim 8, wherein the first processor in the first computer is further configured to execute instructions stored in the first non-transitory computer-readable storage medium to at least:
   generate a fourth timestamp corresponding to a time of receipt of the data bundle by the first computer, the fourth timestamp referenced to the reference time standard;
   determine a time difference between the fourth timestamp and the third timestamp; and
   identify the inaccuracy in the local clock of the client device based on the time difference.

10. The system of claim 9, wherein the time difference is one of a positive time difference or a negative time difference.

11. A method comprising:
   receiving, at a server computer, a data bundle generated by a client device, the data bundle including a description of a first event associated with the client device, a description of a second event associated with the client device, a first timestamp corresponding to an occurrence of the first event, a second timestamp corresponding to an occurrence of the second event, and a third timestamp corresponding to when the data bundle was transmitted by the client device;
   identifying a fourth timestamp corresponding to when the data bundle was received at the server computer, wherein the fourth timestamp is referenced to a reference time standard that is obtained by the server computer from a reference clock source communicatively coupled to the server computer;
   obtain a time difference between the third timestamp and the fourth timestamp;
   determining whether to apply a time shift to the first timestamp and to the second timestamp based on whether the time difference is greater than a threshold error value;
   determining that the time difference is greater than the threshold error value; and
   in response to determining that the time difference is greater than the threshold error value:
      applying the time shift to the first timestamp to obtain a corrected first timestamp and to the second timestamp to obtain a corrected second timestamp, wherein the time shift is obtained based on the time difference between the third timestamp and the fourth timestamp;
      identifying an inaccuracy in a local clock of the client device based on the time difference; and
      sending, by the server computer, an instruction to the client device to correct the inaccuracy in the local clock of the client device.

12. The method of claim 11, wherein the time difference is one of a positive time difference or a negative time difference.

13. The method of claim 11, wherein the first event is associated with at least one of an action executed by a user upon the client device or an autonomous action executed by the client device in response to the action executed by the user.

14. The method of claim 13, further comprising:
   performing a data analytics procedure that comprises analyzing the at least one of the action executed by the user upon the client device or the autonomous action executed by the client device in response to the action executed by the user, wherein the data analytics procedure is performed based on at least one of the corrected first timestamp or the corrected second timestamp.

15. The method of claim 11, further comprising:
at least one of modifying, improving, or developing, a software application based on a data analytics procedure performed upon the data bundle based on at least one of the corrected first timestamp or the corrected second timestamp.

* * * * *